US008816546B2

(12) United States Patent
Bywaters et al.

(10) Patent No.: US 8,816,546 B2
(45) Date of Patent: Aug. 26, 2014

(54) ELECTROMAGNETIC ROTARY MACHINES HAVING MODULAR ACTIVE-COIL PORTIONS AND MODULES FOR SUCH MACHINES

(75) Inventors: Garrett L. Bywaters, Waitsfield, VT (US); Trevor H. Cole, Duxbury, VT (US); Jonathan A. Lynch, St. Johnsbury, VT (US); Jeffrey K. Petter, Williston, VT (US)

(73) Assignee: Northern Power Systems, Inc., Barre, VT (US)

( * ) Notice: Subject to any disclaimer, the term of this patent is extended or adjusted under 35 U.S.C. 154(b) by 25 days.

(21) Appl. No.: 13/240,768

(22) Filed: Sep. 22, 2011

(65) Prior Publication Data

US 2012/0074798 A1    Mar. 29, 2012

Related U.S. Application Data

(60) Provisional application No. 61/385,700, filed on Sep. 23, 2010.

(51) Int. Cl.
*H02K 9/20* (2006.01)
*H02K 1/06* (2006.01)

(52) U.S. Cl.
USPC . 310/54; 310/52; 310/216.049; 310/216.051; 310/216.113

(58) Field of Classification Search
USPC ........ 310/52, 54, 216.049, 216.051, 216.113, 310/431–433
IPC ....................................................... H02K 9/19
See application file for complete search history.

(56) References Cited

U.S. PATENT DOCUMENTS

| | | | |
|---|---|---|---|
| 2,078,668 A * | 4/1937 | Kilgore | 310/433 |
| 3,708,707 A * | 1/1973 | Kranz | 310/433 |
| 4,196,751 A | 4/1980 | Fischer et al. | |
| 4,315,171 A | 2/1982 | Schaeffer | |
| 4,424,463 A | 1/1984 | Musil | |
| 4,769,567 A | 9/1988 | Kurauchi et al. | |

(Continued)

FOREIGN PATENT DOCUMENTS

| | | |
|---|---|---|
| CH | 75705 A | 9/1917 |
| DE | 3546226 A1 | 7/1986 |

(Continued)

OTHER PUBLICATIONS

Machine Translation, WO 2006045772, May 4, 2006.*

(Continued)

*Primary Examiner* — John K Kim
*Assistant Examiner* — Thomas Truong
(74) *Attorney, Agent, or Firm* — Downs Rachlin Martin PLLC

(57) ABSTRACT

Electromagnetic rotary machines, such as electrical power generators and electric motors, that have one or more active portions modularized into a set of modules. Each of the modules is secured to a support frame via a sliding-interlock system that allows that module to be slidingly engaged with the support frame. In some embodiments, each module can include an integrated coolant conduit that carries a coolant to cool the active portion during operation. The modules can each be self-contained in the respect that essentially all that needs to be done to form the active portion and corresponding portion of the cooling system is to install the modules and make any remaining electrical and coolant conduit connections.

72 Claims, 11 Drawing Sheets

(56) References Cited

U.S. PATENT DOCUMENTS

| | | | |
|---|---|---|---|
| 4,990,809 A * | 2/1991 | Artus et al. .................. 310/192 |
| 5,675,196 A * | 10/1997 | Huang et al. ................ 310/67 R |
| 5,844,341 A | 12/1998 | Spooner et al. |
| 6,093,984 A | 7/2000 | Shiga et al. |
| 6,265,804 B1 * | 7/2001 | Nitta et al. ............ 310/216.066 |
| 6,321,439 B1 | 11/2001 | Berrong et al. |
| 6,717,323 B1 | 4/2004 | Soghomonian et al. |
| 6,777,850 B2 | 8/2004 | Harada et al. |
| 6,781,276 B1 | 8/2004 | Stiesdal et al. |
| 6,819,016 B2 * | 11/2004 | Houle et al. .................... 310/52 |
| 6,844,656 B1 | 1/2005 | Larsen et al. |
| 6,975,051 B2 * | 12/2005 | Groening et al. ............... 310/58 |
| 7,113,899 B2 * | 9/2006 | Shah et al. ..................... 703/13 |
| 7,183,689 B2 | 2/2007 | Schmidt et al. |
| 7,808,136 B2 * | 10/2010 | Knauff ........................... 310/59 |
| 8,083,212 B2 | 12/2011 | Numajiri et al. |
| 2002/0074887 A1 | 6/2002 | Takano et al. |
| 2002/0163272 A1 | 11/2002 | Larsson et al. |
| 2006/0131985 A1 | 6/2006 | Qu et al. |
| 2006/0279160 A1 | 12/2006 | Yoshinaga et al. |
| 2008/0115347 A1 | 5/2008 | Majernik et al. |
| 2008/0197742 A1 | 8/2008 | Vollmer |
| 2008/0309189 A1 * | 12/2008 | Pabst et al. .................... 310/218 |
| 2009/0026858 A1 * | 1/2009 | Knauff ........................... 310/59 |
| 2009/0091210 A1 | 4/2009 | Bade et al. |
| 2009/0129931 A1 | 5/2009 | Stiesdal |
| 2009/0172934 A1 | 7/2009 | Mall et al. |
| 2009/0261668 A1 * | 10/2009 | Mantere ......................... 310/54 |
| 2012/0073118 A1 | 3/2012 | Bywaters et al. |
| 2012/0074797 A1 | 3/2012 | Petter et al. |

FOREIGN PATENT DOCUMENTS

| | | |
|---|---|---|
| DE | 19905748 A1 | 8/1999 |
| DE | 19920309 A1 | 11/1999 |
| DE | 10027246 C1 | 10/2001 |
| DE | 102008063783 A1 | 6/2010 |
| EP | 0938181 A1 | 8/1999 |
| EP | 1422806 A2 | 5/2004 |
| EP | 1458080 A1 | 9/2004 |
| EP | 1519040 A1 | 3/2005 |
| EP | 1988282 A2 | 11/2008 |
| EP | 2072814 A2 | 6/2009 |
| EP | 2131475 A2 | 12/2009 |
| EP | 2163528 A1 | 3/2010 |
| EP | 2182570 A1 | 5/2010 |
| EP | 2187506 A1 | 5/2010 |
| EP | 2226502 A1 | 9/2010 |
| EP | 2320080 A1 | 5/2011 |
| ES | 2233146 A1 | 6/2005 |
| JP | 53051407 A * | 5/1978 |
| JP | 1231645 A | 9/1989 |
| JP | 4289759 A | 10/1992 |
| JP | 11335074 A | 12/1999 |
| JP | 2004289919 A | 10/2004 |
| JP | 2005210790 A | 8/2005 |
| JP | 2009131030 A | 6/2009 |
| WO | 0060719 A1 | 10/2000 |
| WO | 0121956 A1 | 3/2001 |
| WO | 2004017497 A1 | 2/2004 |
| WO | 2005031159 A1 | 4/2005 |
| WO | 2006032969 A2 | 3/2006 |
| WO | 2006045772 A1 | 5/2006 |
| WO | 2008014584 A1 | 2/2008 |
| WO | 2008021401 A2 | 2/2008 |
| WO | 2008069818 A1 | 6/2008 |
| WO | 2009112887 A1 | 9/2009 |
| WO | 2010024510 A1 | 3/2010 |
| WO | 2010037392 A2 | 4/2010 |
| WO | 2011031165 A1 | 3/2011 |
| WO | PCT/US2011/052885 | 1/2012 |
| WO | PCT/US2011/052883 | 2/2012 |
| WO | PCT/US2011/052879 | 3/2012 |
| WO | PCT/US2011/052893 | 9/2012 |

OTHER PUBLICATIONS

Machine Translation, EP 0938181, Aug. 25, 1999.*
Oxford English Dictionary, Definition of "integra,", Mar. 17, 2013.*
PCT International Search Report dated Mar. 15, 2012 for related PCT/US2011/052882 entitled "Electromagnetic Rotary Machines Having Modular Active-Coil Portions and Modules for Such Machines," Bywaters, et al.
U.S. Appl. No. 13/240,731, May 30, 2013, Office Action.
"Cogging Torque Minimization Technique for Multiple-Rotor, Axial-Flux, Surface-Mounted-PM Motors: Alternating Magnet Pole-Arcs in Facing Rotors," by Metin Aydin, Ronghai Qu, and Thomas A. Lipo, Industry Applications Conference, 38th IAS Annual Meeting, Oct. 12-16, 2003.
"Nature and Measurements of Torque Ripple of Permanent-Magnet Adjustable-Speed Motors," by John S. Hsu, Brian P. Scoggins, Matthew B. Scudiere, et al., Industry Applications Convference, 1995, 30th IAS Annual Meeting, Oct. 8-12, 1995.
"Design Techniques for Reducing the Cogging Torque in Surface-Mounted PM Motors," by Bianchi, N. et al., IEEE Transactions on Industry Applications, Sep./Oct. 2002, 1259-1265, vol. 38, No. 5.
U.S. Appl. No. 13/240,756, Sep. 22, 2011.
U.S. Appl. No. 13/240,779, Sep. 22, 2011.
U.S. Appl. No. 13/240,731, Sep. 22, 2011.
U.S. Appl. No. 13/240,788, Sep. 22, 2011.
Office Action dated Dec. 19, 2013, in related U.S. Appl. No. 13/240,756 filed on Sep. 22, 2011.
Restriction Requirement dated Mar. 11, 2014, in related U.S. Appl. No. 13/240,779, filed on Sep. 22, 2011.
Restriction Requirement dated Mar. 13, 2014, in related U.S. Appl. No. 13/240,788, filed on Sep. 22, 2011.
Response to Office Action dated Mar. 19, 2014, in related U.S. Appl. No. 13/240,756 filed on Sep. 22, 2011.
Notice of Allowance dated Mar. 28, 2014, in related U.S. Appl. No. 13/240,756 filed on Sep. 22, 2011.
Amendment and Response to Office Action dated Sep. 30, 2013, in related U.S. Appl. No. 13/240,731 filed on Sep. 22, 2011.
U.S. Appl. No. 13/240,731, filed Apr. 9, 2013, Restriction Requirement.
U.S. Appl. No. 13/240,731, filed May 9, 2013, Response to Restriction Requirement.

* cited by examiner

ELECTROMAGNETIC ROTARY MACHINES HAVING MODULAR ACTIVE-COIL PORTIONS AND MODULES FOR SUCH MACHINES

RELATED APPLICATION DATA

This application claims the benefit of priority of U.S. Provisional Patent Application Ser. No. 61/385,700, filed on Sep. 23, 2010, and titled "Electromagnetic Rotary Machines Having Modular Active-Coil Portions And Modules For Such Machines," which is incorporated by reference herein in its entirety.

FIELD OF THE INVENTION

The present invention generally relates to the field of electromagnetic rotary machines. In particular, the present invention is directed to electromagnetic rotary machines having modular active-coil portions and modules for such machines.

BACKGROUND

Certain rotary machines, such as electrical power generators and electric motors, have active portions that are electromagnetically active for the purpose of participating in the generation of electrical power and/or torque, depending on the type/use of machine. These machines can be very large, for example, having diameters on the order of meters and even tens of meters. Such large machines can present challenges in their construction, shipping, and installation, especially where they are constructed in locations remote from manufacturing facilities. Such large machines can also create maintenance challenges when parts of the active portions fail and need to be replaced.

SUMMARY OF THE DISCLOSURE

In one implementation, the present disclosure is directed to an electromagnetic rotary machine. The electromagnetic rotary machine includes first and second active portions, wherein at least one of the first and second active portions rotates relative to the other of the first and second active portions about an operating rotational axis during operation of the electromagnetic rotary machine, the first active portion including: an active-coil assembly having a first side configured to face the second active portion and a second side spaced from the first side, the active-coil assembly including a plurality of recessed receptacle segments on the second side; and at least one coolant conduit engaged in the plurality of recessed receptacle segments.

In another implementation, the present disclosure is directed to an electromagnetic rotary machine. The electromagnetic rotary machine includes first and second active portions, wherein at least one of the first and second active portions rotates relative to the other of the first and second active portions about an operating rotational axis during operation of the electromagnetic rotary machine, the first active portion including: a support frame having a module-receiving region and first and second ends spaced from one another; and a circular active portion supported by the support frame in the module-receiving region, the circular active portion including: a plurality of modules each forming an arcuate segment of the circular active portion and engaged with the support frame via a sliding-interlock system, wherein, prior to being engaged with the support frame, each of the plurality of modules includes: a core having a back and at least one tooth extending from the back; and at least one electrical coil correspondingly respectively surrounding each of the at least one tooth.

In still another implementation, the present disclosure is directed to a module for an active portion of an electromagnetic rotary machine having a support frame for supporting the active portion, wherein the active portion has a circular shape. The module includes a core forming an arc-segment of the circular shape of the active portion, the core including: a back having a first side, a second side spaced from the first side, a third side, a fourth side spaced from the third side, a first end, and a second end spaced from the first end along the arc-segment; and at least one tooth extending from the back on the first side; at least one electrical coil correspondingly respectively surrounding each of the at least one tooth; and at least one sliding-interlock feature on the second side of the core, the at least one sliding-interlock feature configured to correspondingly respectively slidably engage at least one mating sliding-interlock feature on the support frame of the electromagnetic rotary machine.

In yet another implementation, the present disclosure is directed to a module for an active portion of an electromagnetic rotary machine having a support frame for the active portion, wherein the active portion has a circular shape. The module includes a core forming an arc-segment of the circular shape of the active portion, the core including: a back having a first side, a second side spaced from the first side, a third side, a fourth side spaced from the third side, a first end, and a second end spaced from the first end along the arc-segment; and at least one tooth extending from the back on the first side; at least one electrical coil correspondingly respectively surrounding each of the at least one tooth; and at least one coolant conduit integrated into the core.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
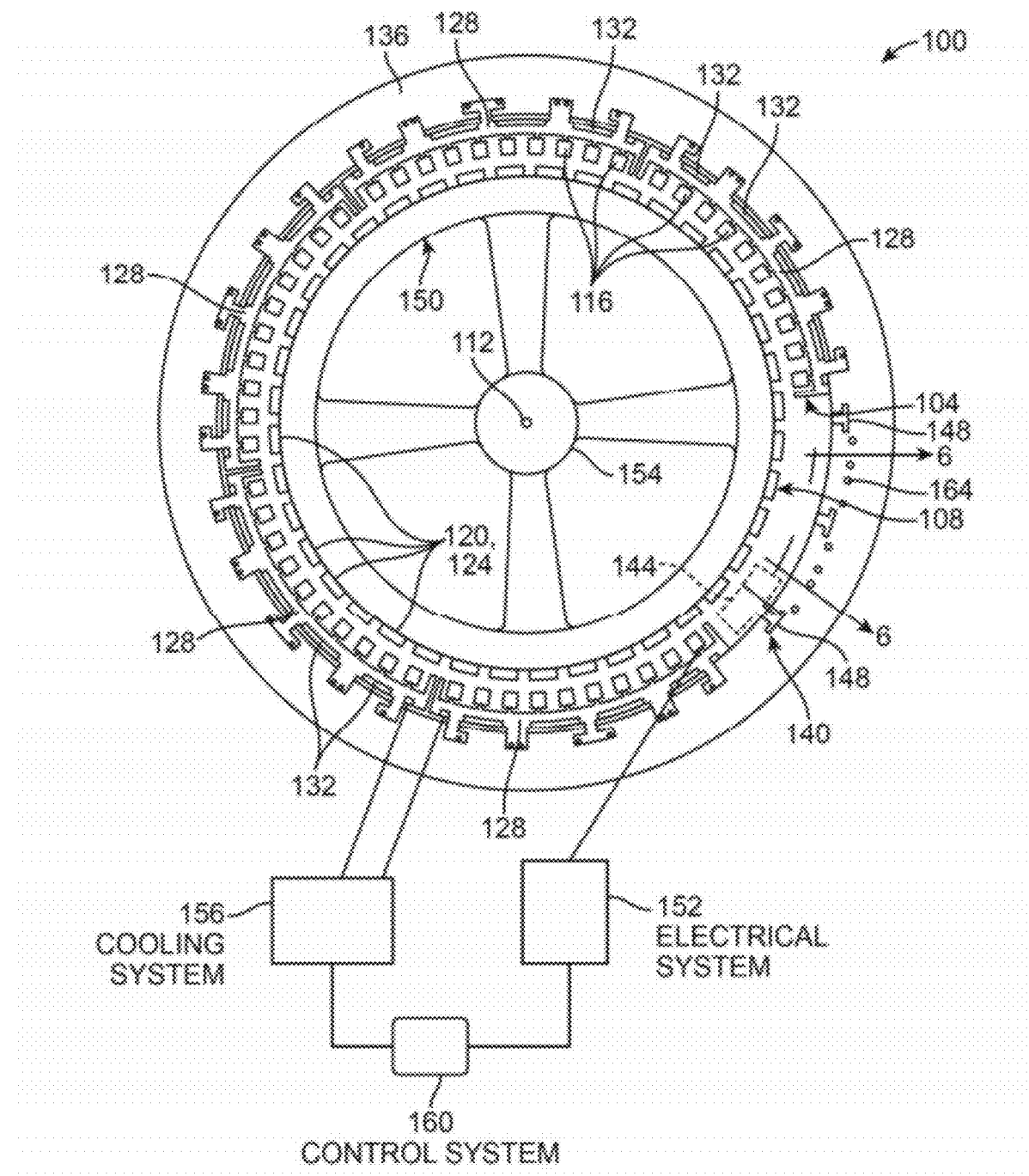
FIG. 1 is a partial diagrammatic view/partial schematic diagram of an electromagnetic rotary machine having a modularized active portion.

Referring now to the drawings, FIG. 1 illustrates primary components of an electromagnetic rotary machine 100 made in accordance with the present invention. Machine 100 includes a first active portion 104 and a second active portion 108, both of which are circular and at least one of which is rotatable relative to the other about a operating rotational axis 112 during operation to contribute to the functionality of the machine. In the example shown, first active portion 104 includes a plurality of electrical coils 116 (only a few of which are labeled to avoid clutter), and second active portion 108 includes a plurality of poles 120 (similarly, only a few are labeled), here, provided by a plurality of permanent magnets 124. (It is noted that in other embodiments, poles can be provided by electromagnets or a combination of permanent and electromagnets.) As those skilled in the art will appreciate, machine 100 can function as an electrical power generator or as an electric motor, depending generally on whether an external torque is being applied to the machine or a torque is being generated by the electromagnetic interaction between first and second active portions 104, 108.

Electromagnetic rotary machine 100 includes a number of useful features, including first active portion 104 being segmented into a plurality of readily replaceable modules, in this example six identical modules 128 (five are shown, the sixth module is not present), and the first active portion including integrated cooling system components, here cooling conduits 132 that are integrated into the individual modules. Advantages of the modularity taught by the present disclosure include the fact that active portions of large electromagnetic rotary machines, for example, machines having diameters measured in meters and tens of meters, can be modularized into manageably sized, but integrated, modules. Each of these modules can include nearly all the necessary electrical and/or cooling components needed to complete the active portion, except, in some cases, parts needed to complete connections between adjacent modules and/or to complete connections to the corresponding electrical and/or cooling systems. This modularity not only assists in shipping and handling, but also in assembly. Such advantages can be very important to various types of applications, such as for large electrical generators for commercial-scale wind power units and hydroelectric stations. The foregoing and other features are described below in detail. However, before describing such features, additional details of the particular example shown in FIG. 1 are first described to give the reader a better understanding of this example and how features of this example can be generalized to other embodiments.

In this example, electromagnetic rotary machine 100 is a three-electrical-phase machine, with the three phases, A, B, C, repeating sequentially around first active portion 104. First active portion 104 is a fixed, electrical-coil-type stator having a total of 60 electrical coils 116, which are divided evenly among the six modules, so that each module 128 has 10 of the coils. With this arrangement, the phases are arranged as follows among the six modules 128.

| Module 1 | Module 2 | Module 3 |
|---|---|---|
| |ABCABCABCA| | |BCABCABCAB| | |CABCABCABC| |
| Module 4 | Module 5 | Module 6 |
| |ABCABCABCA| | |BCABCABCAB| | |CABCABCABC| |

This phasing arrangement, wherein the breakpoints between modules 128 occur between differing pairs of phases, was chosen based on principles disclosed in U.S. patent application Ser. No. 13/240,731, filed on the same date as this disclosure and titled "Electromechanical Machines Having Low Torque Ripple And Low Cogging Torque Characteristics," which is hereby incorporated by reference for its teachings concerning modularizing active portions of electromagnetic rotary machines, including selecting module breakpoints and the design of such modules. Those skilled in the art will appreciate that while the present example involves three electrical phases, 60 electrical coils 116, and six identical modules 128, features disclosed herein are applicable to active portions having any number of electrical phases, any number of electrical coils, and any number of modules, provided that each module has at least one coil. It is noted that the modules need not be identical to one another, in terms of number of coils and/or in terms of one or more other features, such as cooling features, support features, etc.

First active portion 104 and, consequently, each of modules 128, are supported by a suitable support frame 136. As will be exemplified below, in this embodiment modules 128 are individually slidably engageable with support frame 136 via a sliding-interlock system 140 that utilizes sliding-interlock features 144 (only one shown in phantom and labeled for convenience) on each of the modules and corresponding mating sliding-interlock features 148 (likewise, only a few shown and labeled) on the support frame. In this embodiment, sliding-interlock system 140 allows individual modules 128 to be slidably engaged with and disengaged from support frame 136 in directions parallel to operating rotational axis 112. It is noted that circular first active portion 104 is referred to herein as being "cylindrical," with this term being correlated to the longitudinal axes of coils 116 being parallel to operating rotational axis 112. As will be seen below in connection with FIGS. 12-14, other circular active portions that can be modularized in accordance with the present disclosure include annular active portions, i.e., active portions in which the longitudinal axes of the electrical coils are largely radial to the operating rotational axes of the machines, and frusto-conical active portions, i.e., active portions in which the longitudinal axes of the electrical coils are skewed relative to the operating rotational axis in a direction along that axis.

In the embodiment shown, support frame 136 is fixed so that first active portion 104 is the stator of machine 100. Correspondingly, second active portion 108, which contains poles 120, is rotatable relative to first active portion 104 and, in this example, forms part of an overall rotor 150 supported by a central shaft 154. As mentioned above, second active portion 108 includes a plurality of magnets 124 that provide poles 120. In this particular example, machine 100 has a q, i.e., number of slots per pole per phase, of ½, so that the second active portion has 40 poles. Of course, in other designs, the number of poles can be different. As mentioned above, poles 120 of second active portion 108 need not be provided by permanent magnets 124. Rather, poles 120 can be provided by electromagnets (not shown). In embodiments in which the poles are provided by electromagnets, features disclosed herein relative to first active portion 104, such as the modularity features, can also be applied to an electromagnet-pole-type active portion.

For the sake of completeness, some of the other parts of exemplary electromagnetic rotary machine 100 include an electrical system 152, a circulating-coolant-type cooling system 156, and a control system 160. Electrical system 152 is electrically coupled with first active portion 104 and handles the electrical power provided to and/or received from the first active portion. As those skilled in the art will appreciate, the design of electrical system 152 will be influenced by a number of factors, including, but not limited to, the type of machine that machine 100 is (e.g., generator, motor, or both), the rated power/torque of the machine, and the configuration of first active portion 104 (e.g., number of in-hand windings, number of phases, number of coils, electrical connectivity among the coils, etc.), among other things.

Circulated-coolant-type cooling system 156, too, can vary in a number of ways, including type of coolant used, cooling capacity, and manner in which heat from first stator portion 104 is sinked, among other things. It is noted that in some embodiments, the electromagnetic rotary machine at issue need not include a circulated-coolant-type cooling system at all. For example, some environments in which some embodiments of an electromagnetic rotary machine made in accordance with the present disclosure may provide any and all of the heat-sinking necessary without an active cooling system, such as circulating-coolant-type cooling system 156. While in this embodiment machine 100 is provided with circulating-coolant-type cooling system 156, it should be understood that alternative embodiments that include various other features and aspects disclosed herein can be cooled in other ways, such as by air cooling or heat plate cooling. Those skilled in the art will understand how to implement such alternatives with guidance from the present disclosure.

Control system 160 can be designed to control the operation of one, the other, or both, of electrical system 152 and cooling system 156 based on a variety of inputs internal and external to electromagnetic rotary machine 100. Examples of internal inputs include sensor signals from one or more current and/or voltage sensors, one or more temperature sensors, and one or more speed and/or acceleration sensors, among others. Examples of external inputs include one or more operating-parameter values and one or more environmental sensors, among others. Skilled artisans will understand that the design of control system 160 will vary depending on a number of factors that can include, for example, the nature of electrical system 152, the nature of cooling system 156, the type of machine that machine 100 is (e.g., generator, motor, or both), the rated power/torque of the machine, and the configuration of first active portion 104 (e.g., number of in-hand windings, number of phases, number of coils, electrical connectivity among the coils, etc.), among other things. Those skilled in the art will also appreciate that machine 100 can include other components that are not shown, such as various internal and external housings, internal and external support structures, among other items.

Figure 2:
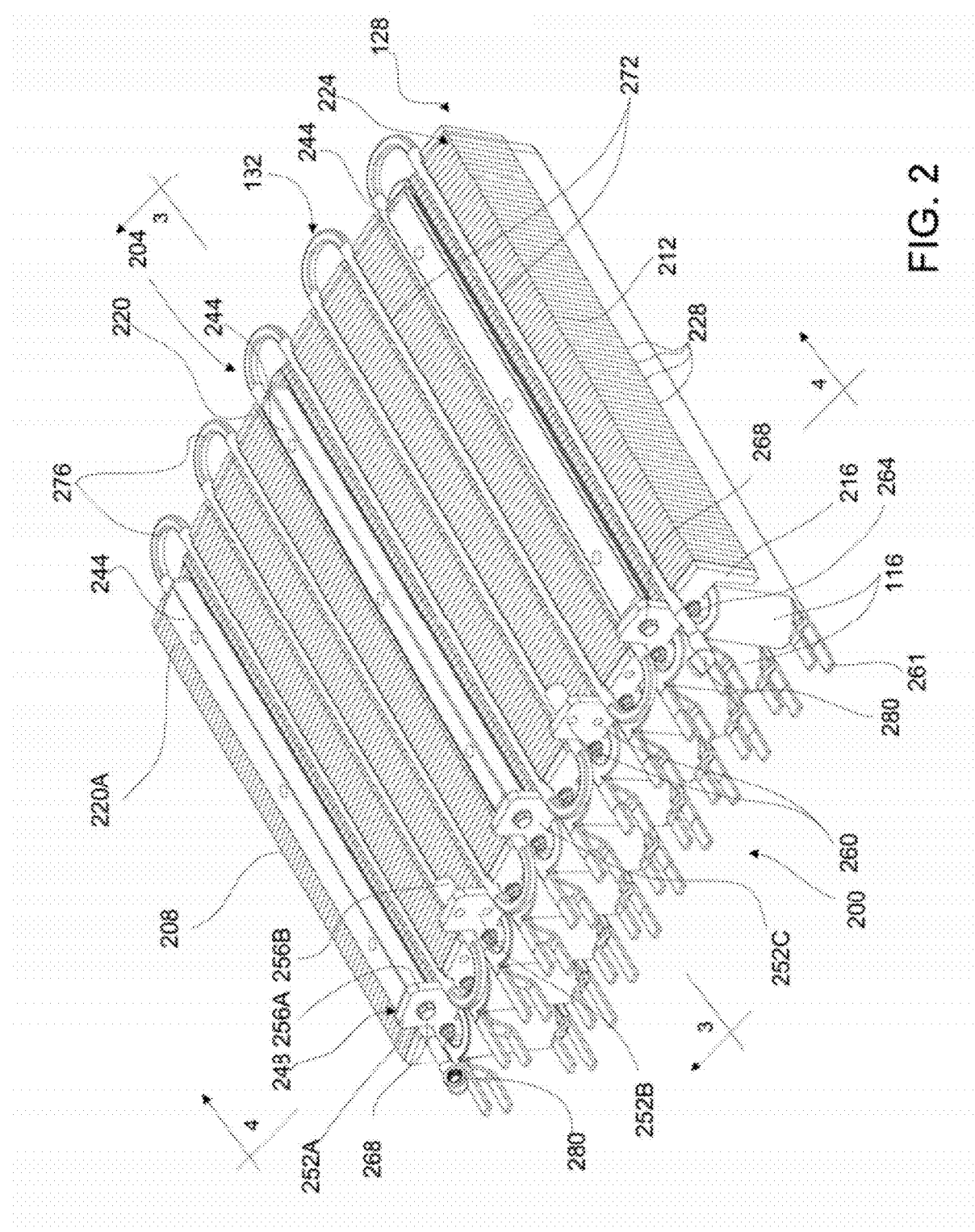
FIG. 2 is an enlarged perspective view of one of the modules of the active portion of FIG. 1.
Figure 3:
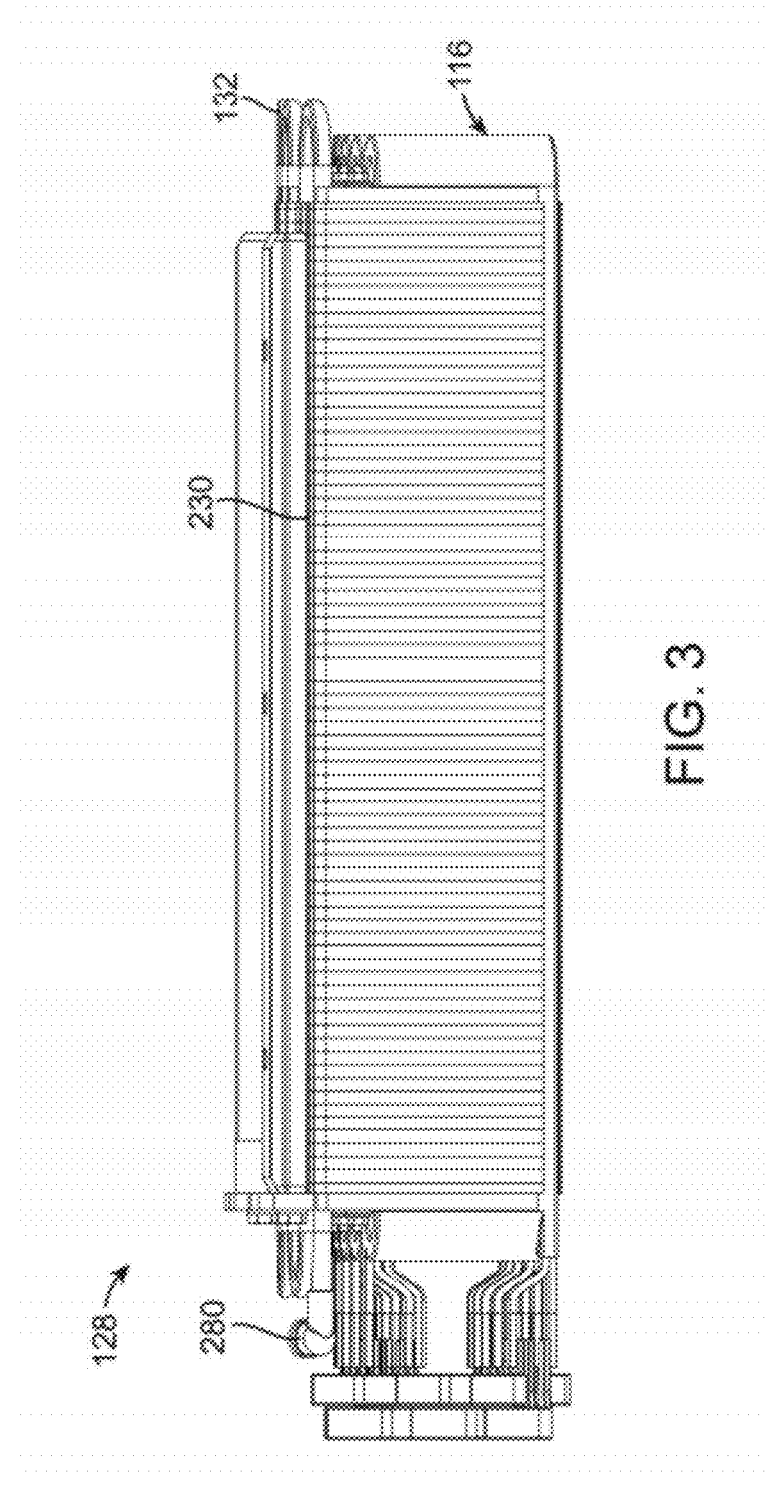
FIG. 3 is a cross-sectional view as taken along line 3-3 of FIG. 2.
Figure 4:
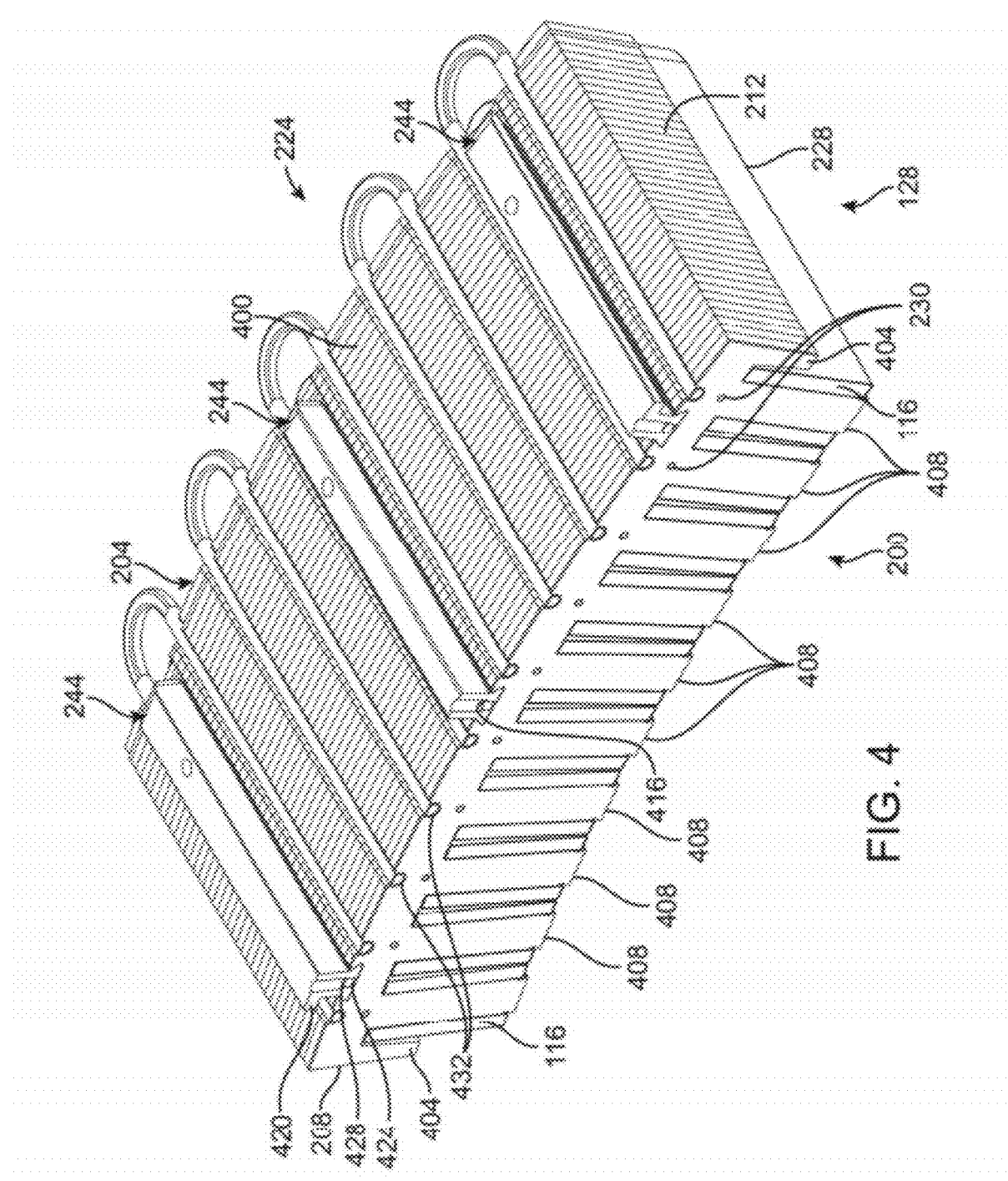
FIG. 4 is a cutaway perspective view of the active-portion module of FIG. 2, with the cut along line 4-4 of FIG. 2.

Referring now to FIGS. 2-4, and occasionally to FIG. 1 as noted, these figures illustrate further features that each module 128 of this example include and show essentially an entire module (FIGS. 2 and 3) as it would be installed into first active portion 104. For convenience, the following terminology is used herein and in the appended claims for the various sides and ends of module 128 and like modules made in accordance with the present disclosure. Module 128 has first and second sides 200, 204 (FIG. 2) spaced apart from one another, with first side 200 facing second active portion 108 (FIG. 1) and second side 204 facing support frame 136 (FIG. 1). Module 128 also includes first and second ends 208, 212 (FIG. 2) spaced from one another along the arc-length of the module and third and fourth ends 216, 220 (FIG. 2) spaced from one another along the direction that the module is inserted into first active portion 104 (FIG. 1).

As seen in FIG. 2, module 128 includes a core 224 that in this example is a laminate composed of a plurality of insulated (e.g., varnished) metal layers 228 (only a few are labeled in a spaced manner for convenience) secured together, for example, by a plurality of through-bolts 230 (see also FIGS. 3 and 4) spaced along the arc-length the core between first and second ends 208, 212 (FIG. 2). It is noted that in other embodiments, core 224 can be a solid body.

FIG. 4 most clearly illustrates core 224 as having a back 400 and a plurality of teeth 404, 408 that extend away from the back and, when module 128 is installed into first active portion 104 (FIG. 1), extend toward second active portion 108 (FIG. 1). As those skilled in the art will understand, back 400 is essentially the sum of the back portions of the individual metal layers 228 (FIG. 2), and each tooth 404, 408 is essentially the sum of corresponding tooth portions of the same metal layers. Teeth 404 are end teeth that form parts of the corresponding first and second ends 208, 212 of module 128, and teeth 408 are central teeth, i.e., teeth located between end teeth 404. It is noted that while end teeth 404 are shown, other embodiments may not have teeth that form parts of first and second ends 208, 212. In this particular example, each of end teeth 404 is essentially one half of a central tooth 408 and is spaced from the immediately adjacent central tooth by a distance that is smaller than the distance between immediately adjacent ones of the central teeth. In this example, this spacing is provided because end teeth 404 do not receive corresponding respective electrical coils in the fully assembled first active portion 104 (FIG. 1).

In other embodiments, a particular design may require the end teeth to receive corresponding respective coils. As one example, this could be accomplished by increasing the spacing between each end tooth 404 and the corresponding immediately adjacent central tooth 408 to the spacing of the central teeth from one another, and engaging a coil around each pair of confronting end teeth from adjacent modules 128 (see FIG. 1). However, this would generally require such coils to be added after the modules are installed in support frame 136 (FIG. 1), which could be a major undertaking.

In the example shown, core 224 has 10 central teeth 408, each of which is surrounded by a corresponding one of electrical coils 116. Coils 116 can have any suitable design, and each can be a single-conductor winding or a multiple-conductor winding having any number of in-hand windings desired to suit a particular design. Each coil 116 can be wound in place on core 224 or wound off the core and engaged with the corresponding central tooth 408 after winding. Coils 116 can be secured to core 224 in any suitable manner, such as using tooth tips (not shown) or other securing means known in the art.

In one example, each coil 116 is a two-in-hand winding comprising first and second windings, with the coils of like phase being electrically connected in a transposed manner by corresponding respective transposing jumpers (not shown). As those skilled in the art will readily appreciate, when transposing jumpers are used they can be provided at all locations where coils 116 on module 128 do not need to be electrically connected to an adjacent module or electrical system 152 (FIG. 1). The missing jumpers or other connections can be made after module 128 is installed in first active portion 104 (FIG. 1).

Figure 5:
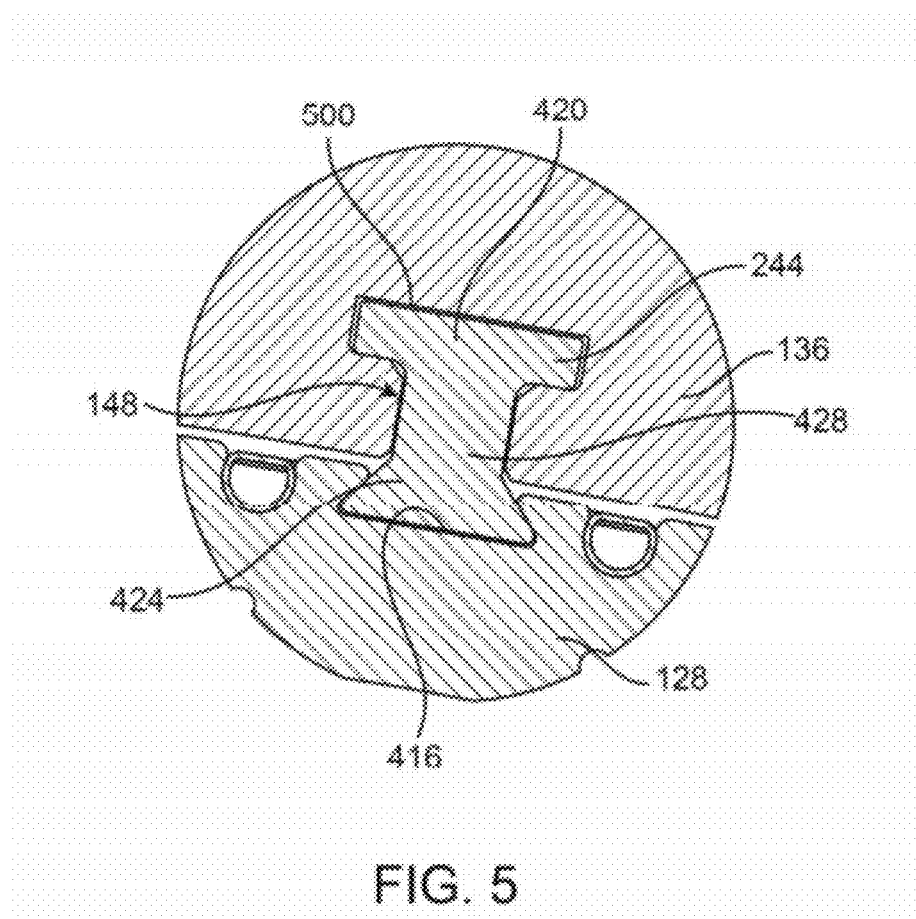
FIG. 5 is an enlarged cross-sectional view of one of the T-bars of the active-portion module of FIG. 2 engaged with the support frame of FIG. 1 via a sliding-interlock system.

It is mentioned above that module 128 has one or more sliding-interlock features 144 (see FIG. 1). In the example shown, module 128 has three such features that take the form of three "T-bars" 244 (FIG. 2). As best seen in FIG. 5, each T-bar 244 of module 128 slidingly engages a corresponding sliding-interlock feature 148 on support frame 136. Referring to FIG. 5, and also to FIG. 6, in this example sliding-interlock feature 148 is a set of three T-shaped notches 500 (FIGS. 5 and 6) formed in corresponding respective ribs 600 (FIG. 6) that are parts of support frame 136. Together, the three T-shaped notches 500 form a linear slideway 604 that receives a corresponding one of T-bars 244. The sizes and shapes of T-bars 244 and T-shaped notches 500 are coordinated to form a snug, but sliding fit of module 128 with support frame 136.

It is noted that while T-bars 244 are shown as continuous elongated members and the corresponding slideways 604 are shown as being composed of spaced notches 500 in corresponding respective ribs 600 of support frame 136 (see FIG. 6), other embodiments can have other configurations. For example, in some other embodiments, each slideway 604 can be continuous. In the case of continuous slideways, each sliding-interlock system 140 on module 128 can be an intermittent-type feature. For example, the reader should be able to envision each T-bar 244 being replaced with a series of two or more spaced headed studs or similar structures that replace the functionality of one of the T-bars.

As best seen in FIG. 4, in this example each T-bar 244 is a two-headed structure formed separately from core 224 and mechanically interlocked with the core via a sliding interlock fit within corresponding respective elongated slots 416 formed within the core. As can be readily envisioned, since core 224 is composed of multiple layers 228, each slot 416 is formed by the sum of corresponding notches formed in ones of the layers. In this example, each T-bar 244 is a solid bar-type member having a first head 420 for slidably engaging a corresponding slideway 604 (FIG. 6) on support frame 136 in a mechanically interlocking manner, a second head 424 for snugly engaging a corresponding slot 416 (FIG. 4) in core 224 in a mechanically interlocking manner, and a neck 428 extending between first and second heads 420, 424. Each T-bar 244 can be secured to core 224 as desired or necessary, for example using any suitable means, including adhesive, interference fit, mechanical fasteners, welding, and any combination thereof. In some embodiments, the securing of T-bars 244 to core 224 may not be desired; a loose sliding fit may be all that is needed. In other embodiments, each T-bar 244 need not be a solid member, but rather may be made up of multiple layers in the manner of core 224 or otherwise made of multiple components.

It also noted that either or both of first and second heads 420, 424 can be tapered in a direction along the length of some or all T-bars 244 as part of a self-alignment system. It is also noted that first and second heads 420, 424 need not have the T- and dovetail-shapes shown, but rather can have any shape that forms a mechanical interlock fit with the corresponding structure, i.e., support frame 136 and core 224, respectively.

Figure 7A:
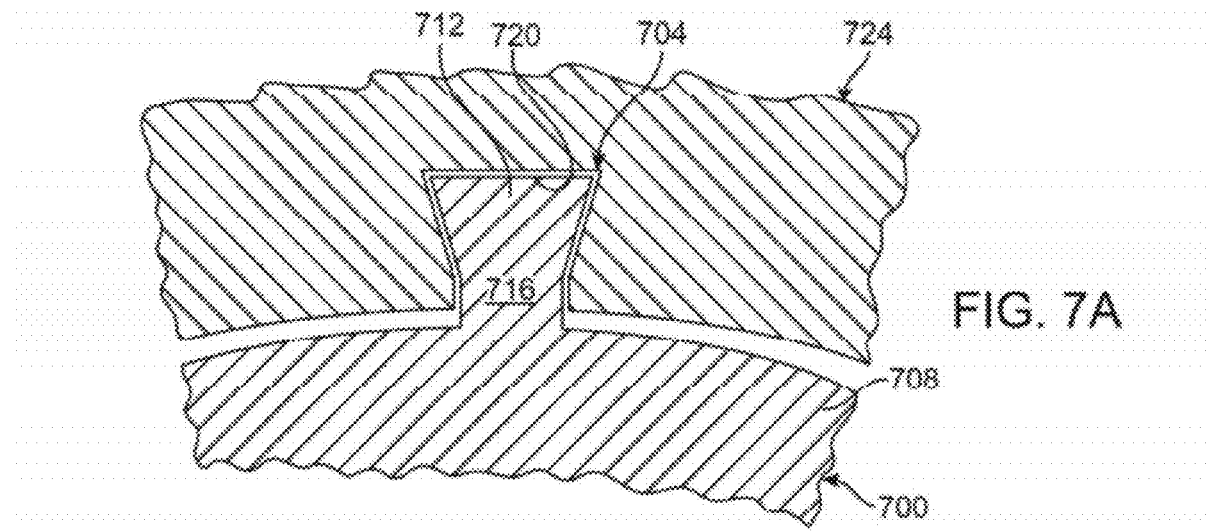
FIGS. 7A-C are cross-sectional views of an alternative sliding-interlock system that can be used to secure an active-portion module to a corresponding support frame.
Figure 7B:
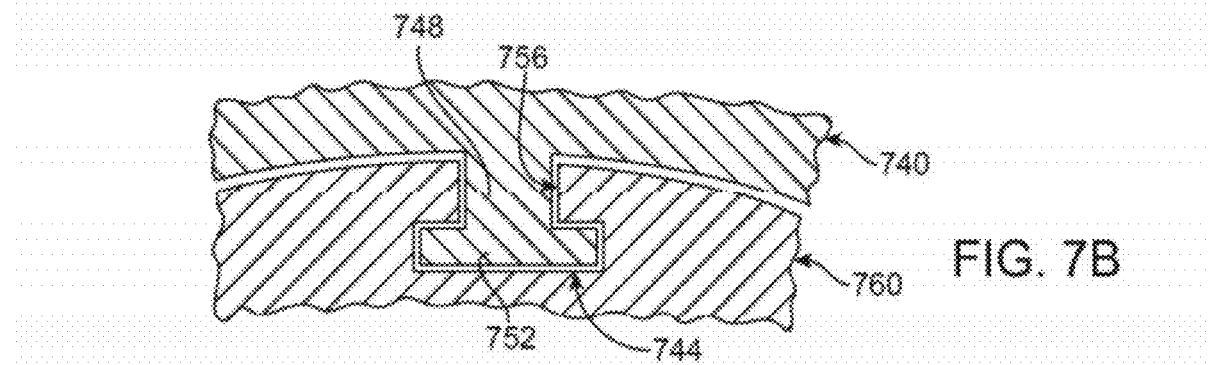
Figure 7C:
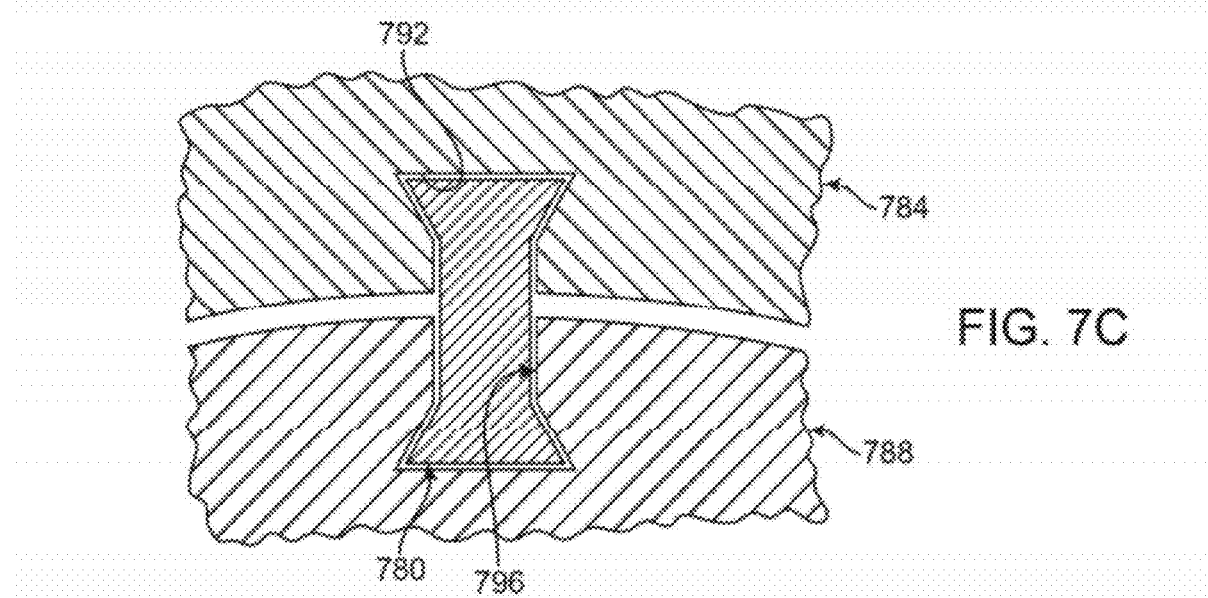

In addition to the foregoing and other variations that can be made to the sliding-interlock system provided for slidably installing an active-portion module to a corresponding support structure, FIGS. 7A-C illustrate three alternative arrangements of sliding-interlock features that can be provided to the active-portion modules and support frames of alternative electromagnetic machines made in accordance with the present disclosure. FIG. 7A shows a module 700 with an sliding-interlock member 704 that is formed integrally with the core 708 of the module. Sliding-interlock member 704 has a head 712 and a neck 716, with the head being sized and shaped to closely, but slidingly, engage a corresponding slideway 720 on an active-portion support frame 724. As those skilled in the art will appreciate, if core 708 is a laminated core composed of multiple layers in a manner similar to core 224 of FIG. 2, sliding-interlock member can be composed of extensions of those layers that are integrally formed by the layers. As another example, if core 708 is a solid core, sliding-interlock member 704 can be formed using casting and/or machining processes.

FIG. 7B shows another arrangement of sliding-interlock features that can be used in a sliding-interlock system for each of the active-portion modules. In this arrangement, support frame 740 includes an integrally formed sliding-interlock member 744. Sliding-interlock member 744 has a neck 748 and head 752 sized and shaped to closely, but slidingly engage, a corresponding slideway 756 on an active-portion module 760. As with T-bar 244 of FIG. 2, sliding-interlock member 744 can be replaced by similarly shaped members that are spaced from one another along the sliding direction. For example, those skilled in the art should be able to readily envision notches 500 (FIGS. 5 and 6) in ribs 600 (FIG. 6) as being replaced by individual headed members secured to the ribs and projecting away from the ribs. Of course, other arrangements are possible.

FIG. 7C shows yet another arrangement of sliding-interlock features that can be used in a sliding-interlock system for each of the active-portion modules. This arrangement is like the arrangement described above in connection with T-bars 244 (FIG. 2), but in the arrangement of FIG. 7C the sliding-interlock member 780 equivalent to one of the T-bars of FIG. 2 is secured to a support frame 784 rather than a module 788. Other aspects of sliding-interlock member 780 and corresponding respective channel 792 and slideway 796 with which the member is engaged can be the same as or similar to corresponding respective components described above relative to FIGS. 1-6.

Referring again to FIGS. 2 and 3, each module 128 includes an end member 248 located at said third end 216 of core 224 that provides the module with an insertion stop for stopping the module from being further inserted into support frame 136 (FIG. 1) and/or a means for fixing that module to the support frame. In this example, end member 248 includes a number of outstanding brackets 252A-C that support corresponding spacers 256A-B and have a plurality of unthreaded bolt holes 260 that receive corresponding respective bolts (not shown) for securing module 128 to support frame 136 (FIG. 1). As those skilled in the art will readily appreciate, in other embodiments end member 248 can be replaced with one or more smaller members and/or have fewer outstanding brackets than shown.

End member 248 is secured to core 128 via through-fasteners 264 that, in this embodiment, also function to hold layers 228 of the core together, as well as a number of bolts 268 that threadedly engage corresponding respective ones of T-bars 244. The bolts (not shown) that extend through corresponding respective bolt holes 260 and spacers 256A-B threadedly engage corresponding respective bolt holes 164 in support frame 136 (FIG. 1). It is noted that in other embodiments, spacers 256A-B need not be provided, and, if they are provided, may be provided in different shapes and sizes from those shown.

In this embodiment each module 128 has only an end member 248 at third end 216 of core 224. This can be done, for example, because only one side of support frame 136 (FIG. 1) is accessible for inserting and removing modules or because the affixation that the end member provides is needed only at one end. However, in other embodiments where the opposite side of support frame 136 is accessible, an end member (not shown) similar to end member 248 can be provided on the opposite side of the frame and module 128. In that case, such end member could be installed after module 128 has been slidingly inserted into support frame 136. Of course, through-fasteners 230 would not be used to secure that second end member to core 224, and the member could be readily modified accordingly and provided with additional fasteners for fastening it to the core, if desired or necessary. Those skilled in the art will understand the variety of end members that can be used to affix module 128 to support frame 136, such that it is not necessary to exhaustively describe alternatives for skilled artisans to understand the large breadth of the appended claims relative to this aspect of the disclosure.

Figure 8:
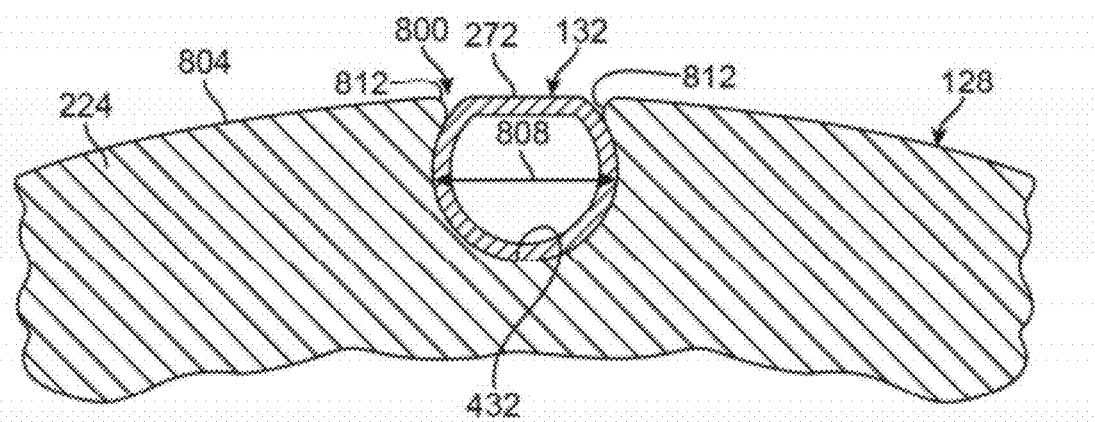
FIG. 8 is an enlarged detail view of the partial core of FIG. 4 showing the coolant conduit and corresponding recessed receptacle segment in which coolant conduit is engaged.

As mentioned above and as seen in FIGS. 1-4 and 8, in this embodiment module 128 includes coolant conduit 132 for receiving a flow of coolant therethrough when the module is installed in the finished electromagnetic rotary machine 100 (FIG. 1) and the machine is operating. As best seen in FIG. 2, in this embodiment coolant conduit 132 is a tube formed into a serpentine shape having straight portions 272 and reversal-bends 276 beyond corresponding respective third and forth ends 216, 220 of core 224. Referring to FIGS. 4 and 8, each straight portion 272 is engaged with a corresponding one of a plurality of recessed receptacle segments 432 formed in core 224. Since each recessed receptacle segment 432 extends the entire width of core 224 and the core is made up of layers 228, each receptacle segment is defined by the sum of like individual notches formed at the same location in each of the layers.

In the present example, coolant conduit 132 is engaged with each recessed receptacle segment 432 by a press-fit, i.e., a fit that requires the wall of the conduit to be distorted in the transverse-cross-section direction during installation of the conduit into that receptacle segment. As best seen in FIG. 8, each recessed receptacle segment 432 has an Ω-shape (more precisely relative to FIGS. 4 and 8, an inverted Ω-shape since the receptacle segments open upward relative to these figures). By "Ω-shape" it is meant that each recessed receptacle segment 432 has a throat opening 800 proximate to the surface 804 of core 224 that is narrower in the direction transverse to the longitudinal axis of the receptacle segment than the widest part of the body 808 of the receptacle segments. In this example, each recessed receptacle segment 432 is substantially circular in shape, except at throat opening 800, which is provided with smooth transitions 812 on both sides of the opening for facilitating the press-fitting of coolant conduit 132 into place.

Those skilled in the art will appreciate that the width of throat opening 800, the material and diameter of coolant conduit 132, and the diameter of body 808 are designed so that the coolant conduit can be press fit into recessed receptacle segments 432 without crushing or other undesirable distortion of the wall of the conduit. For example, the width of throat opening 800 and the material of coolant conduit 132 can be selected so that the coolant conduit substantially only elastically deforms when it is pushed through the throat opening. Then, when coolant conduit 132 is fully engaged in recessed receptacle segment, it substantially returns to its original un-deformed shape, wherein it fills body 808 of the receptacle segment, while at the same time maintaining good physical (and thermal) contact with core 224 to provide good heat-transfer conditions between the core and the conduit and the coolant circulating therein. In the present example, coolant conduit 132 is made from copper tubing. Of course, one or more other suitable materials can be used.

In the exemplary embodiment, coolant conduit 132 is shown as having a particular type of press-fit engagement with recessed receptacle segment 432. This type of press-fit engagement is referred to herein and in the appended claims as a "swaged engagement," since the engagement includes not only elastic deformation of coolant conduit 132, but also permanent deformation of the conduit. This is best seen in FIG. 8.

In FIG. 8, coolant conduit 132 was originally a cylindrical tube. However, by virtue of the relative pertinent dimensions of the coolant conduit and recessed receptacle segment 432 and the depth of the receptacle segment from surface 804, when the conduit is pressed into engagement with the receptacle segment the pressing action forces the conduit into firm engagement with the walls of the receptacle segment. This provides the assembly with excellent physical contact, and therefore excellent thermal contact, between coolant conduit 132 and core 224. An artifact of the swaging process used to create this swaged engagement is that coolant conduit 132 is no longer cylindrical, but rather has a flat portion 812 that is substantially flush with surface 804 of core 224. In the example shown, the perimeter of the curved portion of the slot cross-section is sized to equal the perimeter of the remaining circular cross-section of tube after the tube has been pressed in place. The total perimeter of the tube cross-section remains approximately unchanged as it is deformed from round to Ω-shape.

Referring to FIG. 2, it can be seen that in this embodiment coolant conduit 132 is provided with connection fittings 280 for fluidly coupling this coolant conduit to the like conduits of the immediately adjacent like modules that would be next to module 128 when first active portion 104 is completed. To finish the coupling of two adjacent modules, a separate 180° bend (not shown, but much like reversal-bends 276) fitted with connection fittings (not shown) complementary to fittings 280 is fluidly coupled to the adjacent coolant conduits using the fittings. Those skilled in the art will readily appreciate that coolant conduits of adjacent modules can be fluidly connected in any of a variety of ways, though readily disengagable couplings can provide easier assembly and disassembly.

Figure 9:
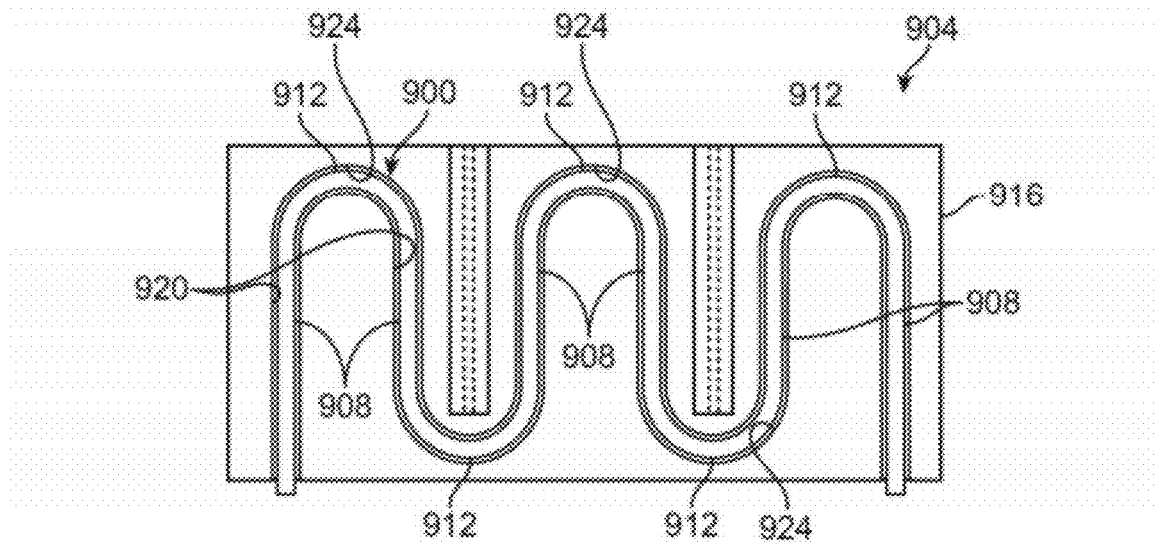
FIG. 9 is a plan view of the backside of an alternative active-portion module that includes a coolant-conduit-receiving recessed receptacle that is largely within the confines of the core.

Those skilled in the art will recognize that the basic processes and structures just described relative to cooling conduit 132 and recessed receptacle segments 432 can be instantiated in a wide variety of ways. For example, the cooling conduit can have a shape other than cylindrical, the conduit can be run in configurations other than the transverse serpentine configuration shown in, for example, FIG. 2. In addition, the cooling conduit can be run nearly entirely within the four ends of the corresponding core (see, e.g., first, second, third, and fourth ends 208, 212, 216, 220 in FIG. 2). FIG. 9 illustrates an example of this last point.

In FIG. 9, coolant conduit 900 of another exemplary module 904 has a number of straight portions 908 and a number of reversal-bends 912 just like coolant conduit 132 (FIG. 2), but in the case of coolant conduit of FIG. 9 reversal-bends 912 do not extend beyond the core 916. In this example, the recessed receptacle segments 920, 924 can be considered to be made of two primary segment types, namely, straight segments 920 and reversal segments 924. Other aspects of module 904 can be the same as or similar to like aspects of module 128 of FIGS. 1-4.

In exemplary electromagnetic rotary machine 100 (FIG. 1) described above, first active portion 104 is a cylindrical stator that is located radially outward of second active portion 108, which comprises a plurality of permanent magnets 124 mounted to rotor 150. Those skilled in the art should appreciate, however, that other machine configurations can benefit from the modularization features taught above. FIGS. 10-14 illustrate a few examples of these alternative configurations and their impacts on the designs of the corresponding active-portion modules.

Figure 10:
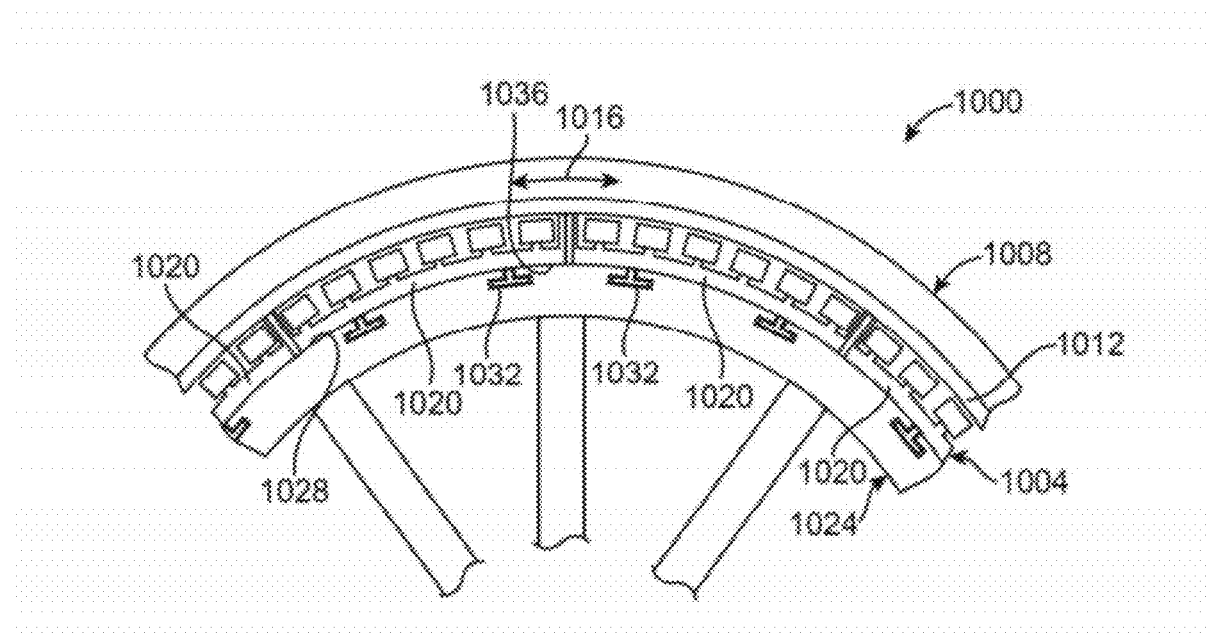
FIG. 10 is a partial end view/partial schematic view of components of an electromagnetic rotary machine having a cylindrical active portion composed of active-portion modules slidably mounted on the outer periphery of a support frame.

FIG. 10 illustrates an electromagnetic rotary machine 1000 having a cylindrical stator, i.e., first active portion 1004, located radially inward of a rotor 1008 having a cylindrical second active portion 1012. First active portion 1004 is fixed, and second active portion 1012 is rotatable relative to the first active portion, as indicated by bidirectional arrow 1016. First active portion 1004 is composed of a plurality of active-portion modules 1020 each slidably engaged with a corresponding support frame 1024 in largely the same manner as active-portion modules 128 of FIG. 1 are slidably engageable with support frame 136. The primary difference of modules 1020 of FIG. 10 relative to modules 128 of FIG. 1 is that each module 1020 is curved in the opposite direction to accommodate its position on the outer periphery 1028 of support frame 1024. In other words, on modules 1020 of FIG. 10 sliding-interlock members 1032 are located on the concave side 1036 of the modules, whereas the sliding-interlock members, i.e., T-bars 244, of modules 128 of FIG. 1 are located on the convex side of the modules. Other physical features (not particularly illustrated) of modules 1020 of FIG. 10, such as the configuration of the teeth of the cores, the configuration and type of the electrical coils, the type and arrangement of the coolant conduits, the manner in which sliding-interlock members 1032 engage the cores, the type and location(s) of end members, etc., can be as described above relative to module 128.

Figure 11:
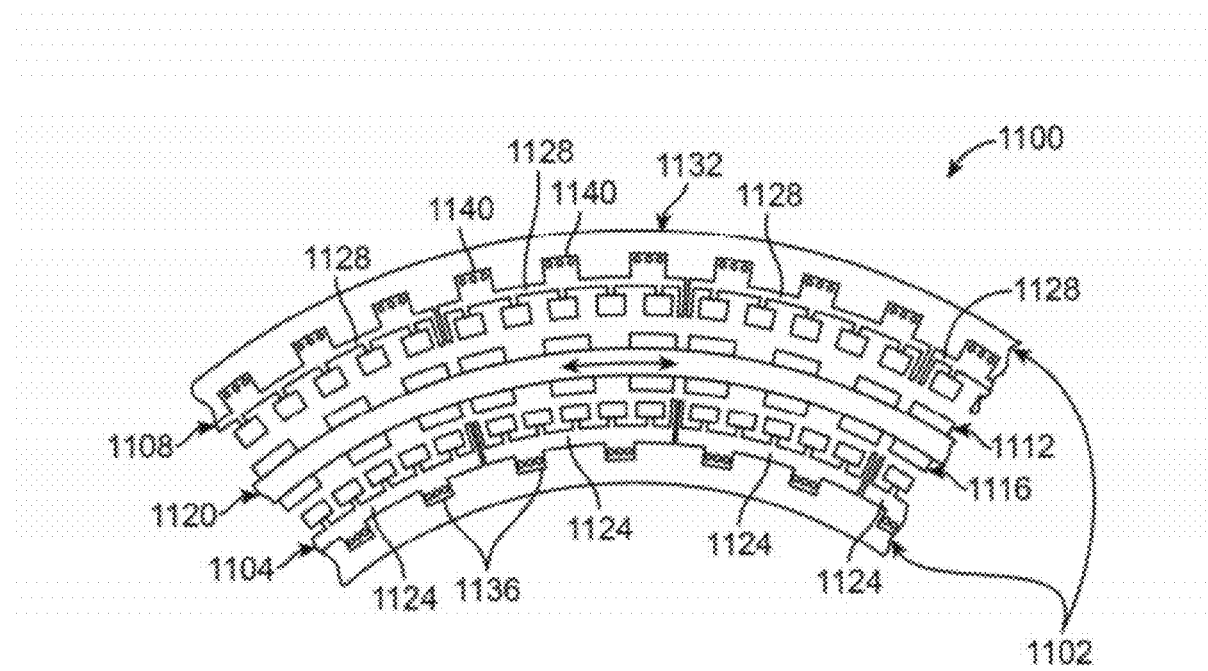
FIG. 11 is a partial end view/partial schematic view of components of an electromagnetic rotary machine having multiple cylindrical active portions that each include multiple modules slidably engaged with a support frame.

FIG. 11 illustrates an electromagnetic machine 1100 having a split stator 1102 having spaced cylindrical first and second active portions 1104, 1108 on either side of third and fourth active portions 1112, 1116 of a two-sided rotor 1120. In this example, each of first and second active portions 1104, 1108 are each modularized into corresponding plurality of modules 1124, 1128 that are slidably engaged with portions of a common support frame 1132 in the general manner that modules 128 of FIG. 1 are slidably engaged with support frame 136. As seen in FIG. 11, modules 1124 are like modules 128 of FIG. 1 in that their sliding-interlock members (not shown, but behind end members 1136) are located on the convex sides of modules 1124, and modules 1128 are like modules 1020 of FIG. 10 in that their sliding-interlock members (not shown, but behind end members 1140) are located on the concave sides of modules 1128. Other physical features (not particularly illustrated) of modules 1124, 1128 of FIG. 11, such as the configuration of the teeth of the cores, the configuration and type of the electrical coils, the type and arrangement of the coolant conduits, the manner in which sliding-interlock members engage the cores, the type and location(s) of end members 1136, 1140, etc., can be as described above relative to module 128.

Figure 12:
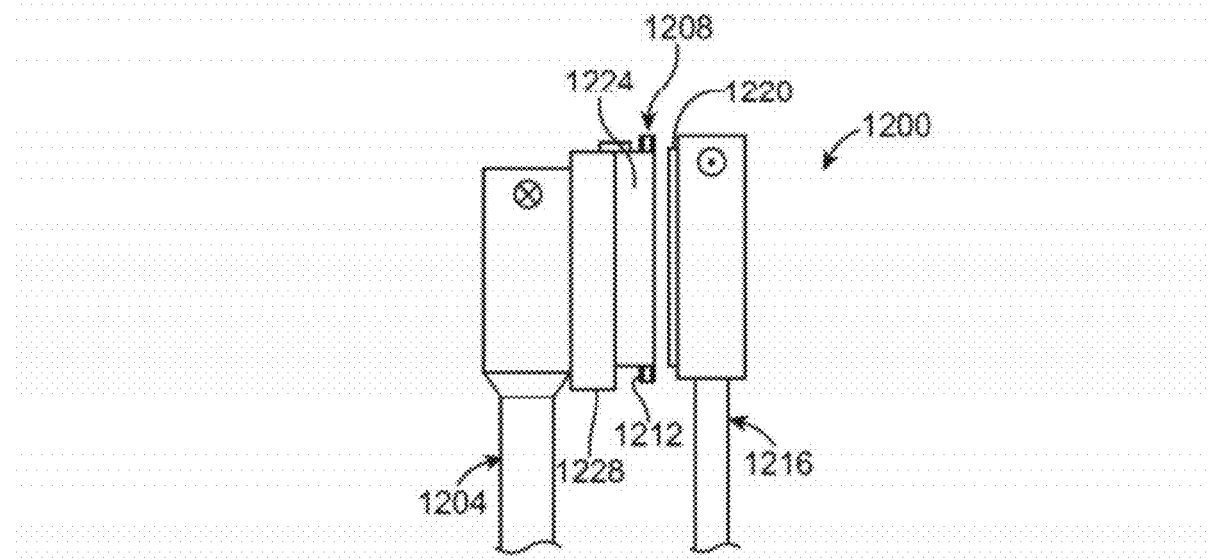
FIG. 12 is a partial side view/partial schematic view of components of an electromagnetic rotary machine having an annular active portion that includes multiple active-portion modules slidably engaged with a support frame.
Figures 13, 14:
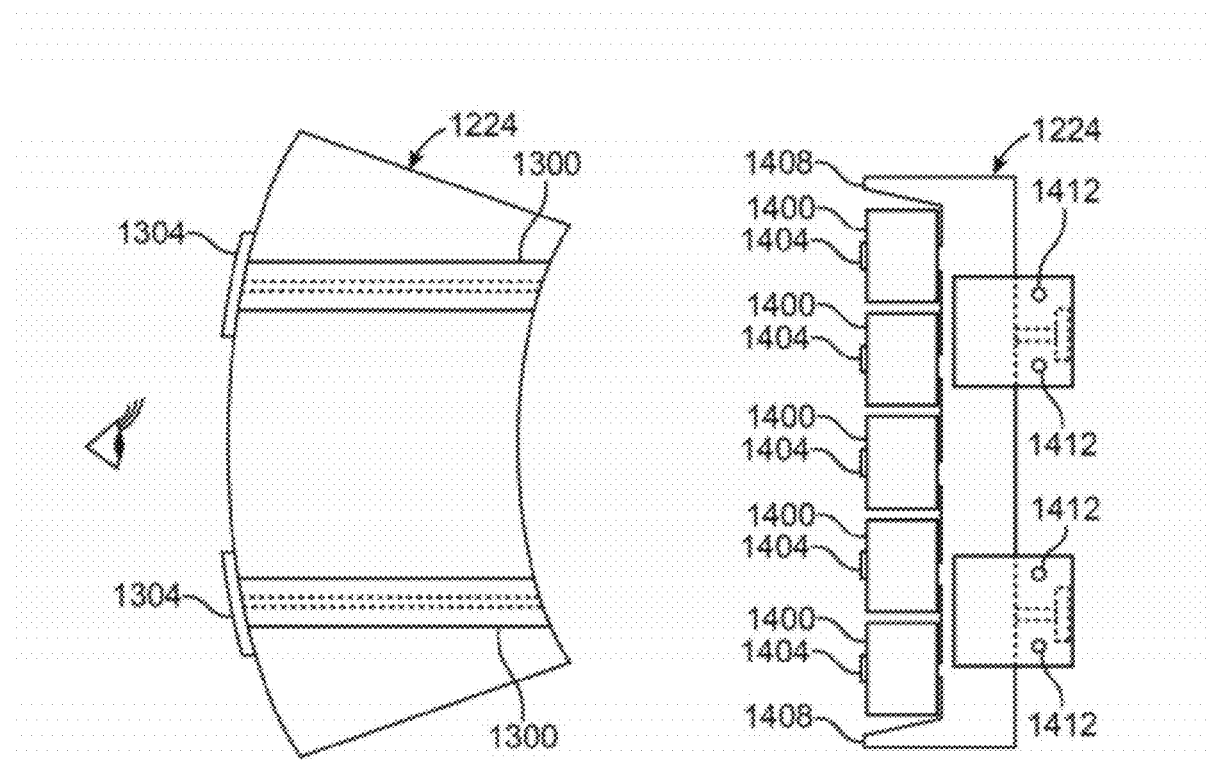
FIG. 13 is an enlarged view of the backside of one of the active-portion modules of the machine of FIG. 12.
FIG. 14 is an end view of the active-portion module of FIG. 13 as viewed from the perspective of vantage point VP of FIG. 13.

Each of electromagnetic rotary machines 100, 1000, 1100 of FIGS. 1, 10, and 11, respectively, have modularized active portions 104, 1004, 1104, 1108 that are largely cylindrical in their configurations. As illustrated by FIGS. 12-14, the modularization techniques disclosed above for such cylindrical active portions are also applicable to electromagnetic rotary machines having annular active portions. Referring first to FIG. 12, this figure illustrates an electromagnetic machine 1200 that includes a first rotor 1204 having a first active portion 1208 that is annular. By "annular" it is meant that the coils 1212 extend radially relative to the operating rotational axis (not shown) of rotor 1204, as opposed to extending parallel to the operating rotational axis of the machine, as occurs in machines 100, 1000, 1100 of FIGS. 1, 10, and 11, respectively.

Electromagnetic rotary machine 1200 also includes a second rotor 1216 having a second active portion 1220. During normal operation of rotary machine 1200, first and second rotors 1204, 1216 rotate in opposite directions. An example of this type of machine is a wind power unit having two wind turbines at opposing ends of a nacelle, wherein the turbine are driven by the wind in opposite directions. The two wind turbines are mechanically coupled, for example, in a direct drive manner, to corresponding respective ones of first and second rotors 1204, 1216. In any event, first active portion 1208 is modularized according to techniques disclosed above so as to be composed of a plurality of arc-shaped active-portion modules 1224, one of which is shown a bit more particularly in FIGS. 13 and 14.

As seen in FIG. 13, which is a view of the backside of one of active-portion modules 1224, each of the modules forms an arcuate segment of the annular first active portion 1208 (FIG. 12) and is sized so that when all of the modules are installed they form a continuous annulus, except for the breaks between adjacent modules. As with modules 128 of FIG. 1, modules 1224 can be provided in any number suited to the particular design at issue. In this example, there are 12 modules 1224 each providing 30° of arc of the annular first active portion 1208. Each module 1224 has two sliding-interlock features 1300 that allow that module to be installed onto first rotor 1204 (FIG. 12) from the radially outward side of the first rotor. Here, sliding-interlock features 1300 are T-bars similar to T-bars 244 of FIG. 2. Although not shown, the support frame 1228 on first rotor 1204 of FIG. 12 includes sliding-interlock features that are complementary to sliding-interlock features 1300. Each module 1224 also includes a pair of end members 1304 for securing that module to the support frame 1228 (FIG. 12) of first rotor 1204 in a manner similar to end member 248 of FIG. 2.

FIG. 14 best shows that in this embodiment each active-portion module 1224 has five electrical coils 1400 engaged around five corresponding respective central teeth 1404. Each module 1224 also includes a pair of end teeth 1408 located at first and second ends of the module Like end teeth 404 of FIG. 4, end teeth 1408 of FIG. 14 are essentially half-teeth that are not wound in the final assembly. However, in other embodiments, once two modules 1224 have been installed side-by-side, confronting pairs of end teeth 1408 can be provided with a coil. In yet other embodiments, end teeth are not provided at all. FIG. 14 also shows that each end member includes a set of bolt holes 1412 for receiving corresponding respective bolts (not shown) for fixing module 1224 to support frame 1228 (FIG. 12), which would include, for example, bolt holes (not shown) similar to bolt holes 164 in support frame 136 of FIG.

1. Aspects of modules 1224 not described can be the same as those aspects of module 128 as described above relative to FIG. 1 and others.

It is noted that the modularization techniques disclosed herein can also be used to modularize active portions having longitudinal electrical-coil axes that are skewed relative to the operating rotational axes, such as would occur in a frusto-conical active portion.

Figure 6:
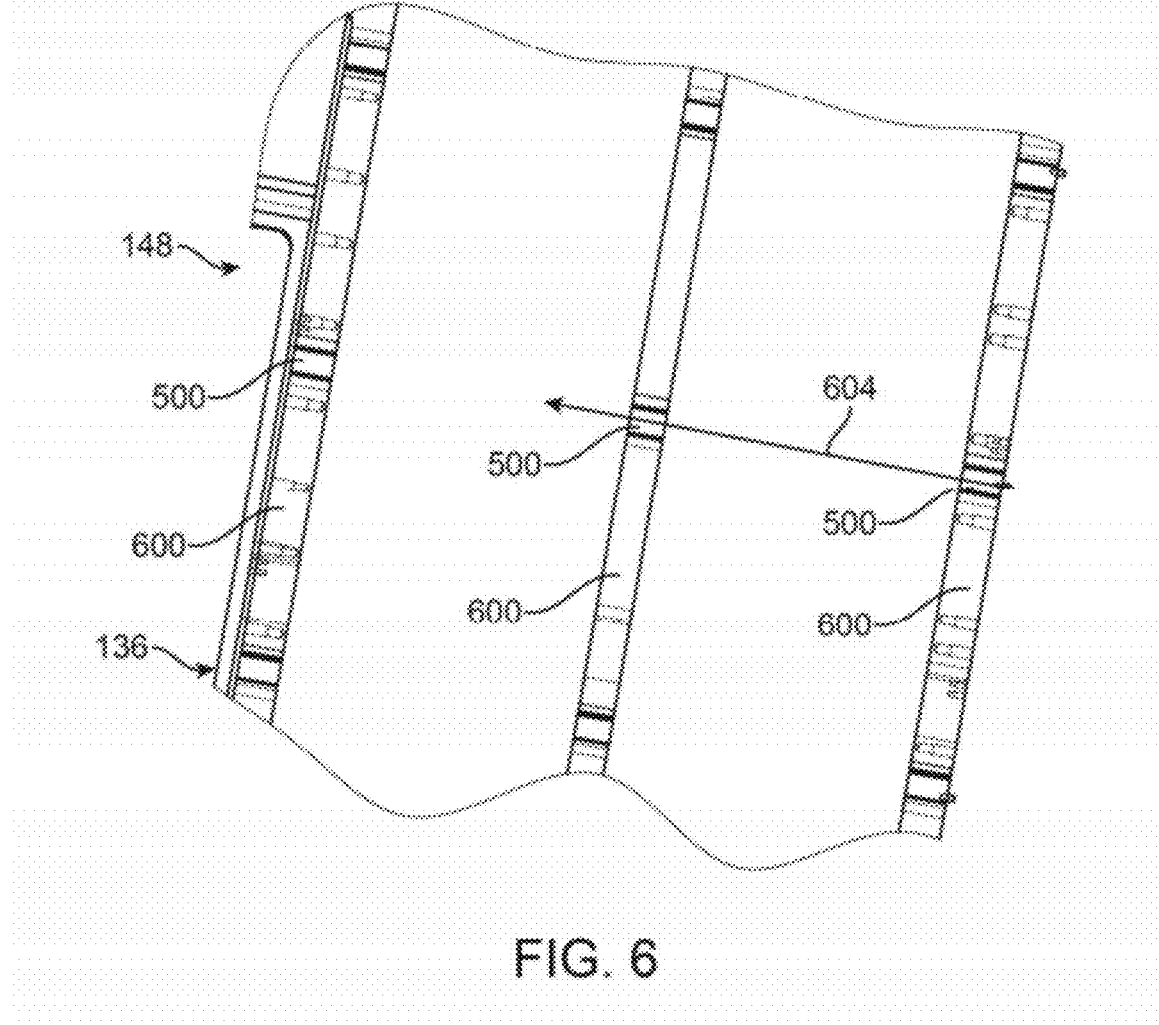
FIG. 6 is an enlarged view of the module support frame as taken along line 6-6 of FIG. 1.
Figure 15:
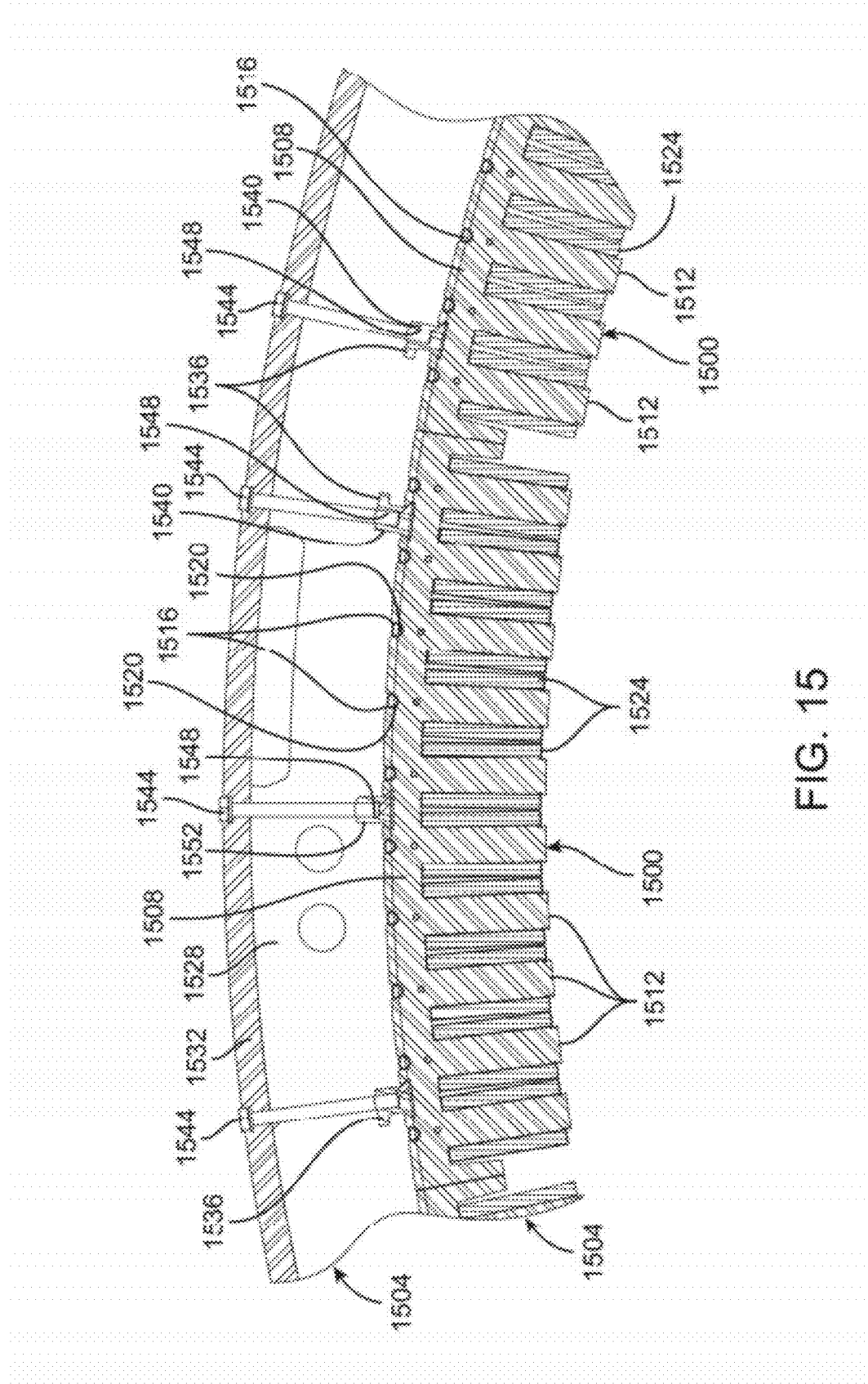
FIG. 15 is a cross-sectional partial view of a pair of alternative active-portion modules engaged with and secured to a support frame.

FIG. 15 shows a pair of identical active-portion modules 1500 that illustrate a further example of sliding-interlock features and a further example of how the modules can be secured to a support frame, here support frame 1504. As those skilled in the art will readily appreciate, module 1500 can be the same as or similar to module 128 of FIGS. 1-4 in some or all of the features not described below, include the configurations of core 1508, teeth 1512, cooling conduits 1516 and corresponding conduit receptacles 1520, windings 1524, etc. Similarly, support frame 1504 can be the same as or similar to support frame 136 shown in FIGS. 1, 5, and 6 in some or all of the features not described below, including the configurations of ribs 1528 (only one shown, but can be two or more as illustrated in FIG. 6) and backing plate 1532. Consequently, such features are not repeated here for the sake of brevity.

In this example, the sliding-interlock features include a pair of generally L-shaped slide-rails 1536 fixedly engaged with each module 1500 and corresponding respective L-shaped notches 1540 formed in each rib 1528. Each notch 1540 is configured to conformally receive the corresponding slide-rail 1536 with enough clearance to permit the sliding engagement of that rail with support frame 1504 in the manner of slideway 604 of FIG. 6.

Once each module 1500 is fully inserted into support frame 1504 to its operational position, it is secured to the frame in a radial direction using anchor bolts 1544 that in this example extend radially through backing plate 1532 to corresponding respective threaded receivers 1548 on the module. In the present example, some of threaded receivers 1548 are formed in slide-rails 1536, which are located proximate the lateral ends of the respective modules 1500, and others are formed in central bars 1552 (only shown on one module) that in this example are located at the middles of the respective modules. As those skilled in the art will readily appreciate, the circumferential spacing of anchor bolts 1544 can be determined using routine engineering principles.

FIG. 15 illustrates a single row of anchor bolts 1544 along a circular line parallel to the plane of FIG. 15. However, those skilled in the art will readily appreciate that a typical installation will typically include multiple such rows of anchor bolts. For example, in the three-rib arrangement illustrated in FIG. 6, two rows (not shown) of anchor bolts (not shown) could be arranged with the rows falling midway between the pairs of adjacent ribs 600 or they could be located proximate to the outer ribs or they could be located at the outer ribs such that the corresponding bolt-holes extend through those ribs. If three such rows were used, they could, for example, be located at ribs 600 such that all of the bolt-holes extend through the ribs or they could be located adjacent to the ribs. Those skilled in the art will readily appreciate that other anchor bolt arrangements are possible. In addition, it is noted that each module 1500 can also contain features for securing that module to support frame 1504 in an axial direction (axial relative to the rotational axis of the machine of which the support frame and modules are parts) in addition to the radial direction shown in FIG. 15. Examples of those features are shown in FIG. 2 as outstanding brackets 252A-C and spacers 256A-B. The corresponding axial fasteners are not shown. However, those skilled in the art will readily understand how such fasteners would engage corresponding features (not shown), such as bolt holes, threaded studs, etc., on support frame 1504.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electromagnetic rotary machine, comprising:
a support frame;
first and second active portions, wherein at least one of said first and second active portions rotates relative to the other of said first and second active portions about an operating rotational axis during operation of the electromagnetic rotary machine, said first active portion including:
an active-coil assembly having a first side configured to face said second active portion, a second side spaced from said first side, a third side, and a fourth side spaced from said third side, said active-coil assembly including a plurality of recessed receptacle segments on said second side, wherein each of said plurality of recessed receptacle segments has a body, a throat opening, and a transverse cross-section of an Ω-shape defined by said body and said throat opening;
at least one sliding-interlock feature on said second side of said active-coil assembly, said at least one sliding-interlock feature configured to correspondingly respectively slidably engage at least one mating sliding-interlock feature on the support frame of the electromagnetic rotary machine;
an end member secured to said active-coil assembly at said third side and extending beyond said second side and each of said at least one sliding-interlock feature to provide an interference with the support frame when said active-coil assembly is slidably engaged with the support frame so as to provide the module with a slide stop; and
at least one coolant conduit having a press-fit engagement with said plurality of recessed receptacle segments;
wherein:
said throat opening has a width in a plane containing said transverse cross-section;
said at least one coolant conduit has an original un-deformed shape and a diameter greater than said width; and
said press-fit engagement with said plurality of recessed receptacle segments is effected by substantially only elastic deformation of said at least one conduit as said at least one conduit is forced through said throat opening such that said at least one conduit substantially returns to said original un-deformed shape when said at least one conduit is located in said body.

2. An electromagnetic rotary machine according to claim 1, each of said plurality of recessed receptacle segments has a longitudinal axis substantially parallel to said operating rotational axis.

3. An electromagnetic rotary machine according to claim 2, wherein said at least one coolant conduit is engaged with ones of said plurality of recessed receptacle segments so as to form a serpentine shape, such that said at least one conduit includes a reversal-bend between adjacent ones of said plurality of recessed receptacle segments in which said at least one coolant conduit is engaged.

4. An electromagnetic rotary machine according to claim 3, wherein said active-coil assembly includes a first end and a second end spaced from said first end in a direction parallel to said operating rotational axis and each of said plurality of recessed receptacles extends from said first end to said second end, each said reversal-bend being located beyond a corresponding one of said first and second ends.

5. An electromagnetic rotary machine according to claim 4, wherein said second side has a face and said at least one coolant conduit has a swaged engagement with said plurality of recessed receptacle segments so that said at least one coolant conduit has an outer surface that is substantially flush with said face.

6. An electromagnetic rotary machine according to claim 1, wherein said first active portion is a cylindrical stator, said active-coil assembly forming the entirety of said cylindrical stator.

7. An electromagnetic rotary machine according to claim 1, wherein said first active portion comprises a plurality of active-portion modules, said active-coil assembly forming one of said plurality of active-portion modules.

8. An electromagnetic rotary machine according to claim 7, wherein each of said plurality of recessed receptacle segments has a longitudinal axis substantially parallel to said operating rotational axis.

9. An electromagnetic rotary machine according to claim 8, wherein said at least one coolant conduit is engaged with ones of said plurality of recessed receptacle segments so as to form a serpentine shape, such that said at least one conduit includes a reversal-bend between adjacent ones of said plurality of recessed receptacle segments in which said at least one coolant conduit is engaged.

10. An electromagnetic rotary machine according to claim 9, wherein said active-coil assembly includes a first end and a second end spaced from said first end in a direction parallel to said operating rotational axis and each of said plurality of recessed receptacles extends from said first end to said second end, each said reversal-bend being located beyond a corresponding one of said first and second ends.

11. An electromagnetic rotary machine according to claim 10, wherein said second side has a face and said at least one coolant conduit has a swaged engagement with said plurality of recessed receptacle segments so that said at least one coolant conduit has an outer surface that is substantially flush with said face.

12. An electromagnetic rotary machine according to claim 1, wherein said second side of said active-coil assembly has a surface and each of said plurality of recessed receptacle segments has a body and a throat opening located between said surface and said body, wherein said throat opening has a first width in said transverse cross-section, said body includes a widest part having a second width in said transverse cross-section, and said first width is less than said second width.

13. An electromagnetic rotary machine according to claim 12, wherein said throat opening has first and second lateral sides spaced from one another and includes a first smooth transition to said surface of said active-coil assembly on said first lateral side, and a second smooth transition to said surface of said active-coil assembly on said second lateral side, each of said first and second smooth transition designed and configured for facilitating the press-fit engagement.

14. An electromagnetic rotary machine according to claim 12, wherein said second side has a face and said at least one coolant conduit has a swaged engagement with said plurality of recessed receptacle segments so that said at least one coolant conduit has an outer surface that is substantially flush with said face.

15. An electromagnetic rotary machine according to claim 1, wherein said body is defined by a wall that has a circular transverse cross-sectional shape having a diameter that is substantially the same as said diameter of said coolant conduit, such that, when said at least one coolant conduit substantially returns to said original un-deformed shape within said body, said at least one coolant conduit engages said wall throughout said body.

16. An electromagnetic rotary machine, comprising:
first and second active portions, wherein at least one of said first and second active portions rotates relative to the other of said first and second active portions about an operating rotational axis durng operation of the electromagnetic rotary machine, said first active portion including:
  a support frame having a module-receiving region and first and second ends spaced from one another; and
  a circular active portion supported by said support frame in said module-receiving region, said circular active portion including:
  a plurality of modules each forming an arcuate segment of said circular active portion and engaged with said support frame via a sliding-interlock system,
  wherein, prior to being engaged with said support frame, each of said plurality of modules includes:
    a core having a back with a first side, a second side spaced from said first side, a third side, and a fourth side spaced from said third side;
    at least one tooth extending from said back on said first side;
    a coolant conduit;
    at least one sliding-interlock feature on said second side of said core, said at least one sliding-interlock feature configured to correspondingly respectively slidably engage at least one mating sliding-interlock feature on the support frame;
    an end member secured to said core at said third side and extending beyond said second side and each of said at least one sliding-interlock feature to provide an interference with the support frame when the module is slidably engaged with the support frame so as to provide the module with a slide stop; and
    at least one electrical coil correspondingly respectively surrounding each of said at least one tooth;
  wherein:
    each said core includes a face located on said back and spaced from said at least one tooth, wherein said face includes a plurality of receptacle segments recessed into said back relative to said face, and said coolant conduit includes tubing engaged with each of said plurality of receptacle segments; and
    each of said plurality of recessed receptacle segments has, a body, a throat opening, and a transverse cross-section of an Ω-shape defined by said body and said throat opening, and said tubing has a press-fit engagement with said plurality of recessed receptacle segments so as to conform to said Ω-shape, wherein:
      said throat opening has a first width in a plane containing said transverse cross-section;
      said tubing has an original un-deformed shape and a diameter greater than said first width; and
      said press-fit engagement with said plurality of recessed receptacle segment is effected by substantially only elastic deformation of said tubing as said tubing is forced through said throat opening such that said tubing substantially returns to said original un-deformed shape when said tubing is located in said body.

17. An electromagnetic rotary machine according to claim 16, wherein said at least one tooth includes first and second end teeth located at opposing ends of said core and at least one central tooth located between said first and second end teeth, said at least one electrical coil correspondingly respectively surrounding each of said at least one central tooth.

18. An electromagnetic rotary machine according to claim 17, wherein, when the electromagnetic rotary machine is completed, said first and second end teeth of each said core are not surrounded by corresponding respective electrical coils.

19. An electromagnetic rotary machine according to claim 18, wherein each of said plurality of modules has an insertion end for being inserted into said support frame first relative to other parts of that one of said plurality of modules and, prior to being engaged with said support frame, includes a securing end member fixed to said core opposite said insertion end, wherein said securing end member is configured for securing that one of said plurality of modules to said support frame.

20. An electromagnetic rotary machine according to claim 17, wherein said at least one central tooth has a height, extending in a direction radial to said operating rotational axis, and each of said first and second end teeth has a height, extending in said direction, that is about half said height of said at least one central tooth.

21. An electromagnetic rotary machine according to claim 16, wherein each of said plurality of modules includes, prior to being engaged with said support frame, said coolant conduit configured for receiving a circulated coolant during operation of the electromagnetic rotary machine.

22. An electromagnetic rotary machine according to claim 21, wherein said coolant conduit is configured to be fluidly coupled to like integral coolant conduits of corresponding respective adjacent ones of said plurality of modules when said plurality of modules are installed into the electromagnetic rotary machine.

23. An electromagnetic rotary machine according to claim 16, wherein each of said plurality of recessed receptacle segments has a longitudinal axis substantially parallel to said operating rotational axis.

24. An electromagnetic rotary machine according to claim 16, wherein said tubing is a single tube engaged with ones of said plurality of recessed receptacle segments in a serpentine manner so that said single tube includes a reversal-bend between each pair of adjacent ones of said plurality of recessed receptacle segments with which said single tube is engaged.

25. An electromagnetic rotary machine according to claim 24, wherein said core includes a first end and a second end each extending between said opposing ends of said core and each of said plurality of recessed receptacles extends from said first end to said second end, each said reversal-bend being located beyond a corresponding one of said first and second ends.

26. An electromagnetic rotary machine according to claim 16, wherein each of said plurality of recessed receptacle segments has a body and a throat opening located between said surface and said body, wherein said throat opening has a first width in said transverse cross-section, said body includes a widest part having a second width in said transverse cross-section, and said first width is less than said second width.

27. An electromagnetic rotary machine according to claim 16, wherein said second side has a face and said at least one coolant conduit has a swaged engagement with said plurality of recessed receptacle segments so that said at least one coolant conduit has an outer surface that is substantially flush with said face.

28. An electromagnetic rotary machine according to claim 16, wherein each of said plurality of modules has an arcuate sector length, each of said plurality of sliding-interlock systems including at least two interconnecting members extending between a corresponding one of said plurality of modules and said support frame and spaced from one another along said arcuate sector length of said corresponding one of said plurality of modules.

29. An electromagnetic rotary machine according to claim 28, wherein said frame includes a plurality of first slot-type receivers defining a plurality of slideways, and each of said interconnecting members is fixed to said corresponding one of said plurality of modules and includes a first headed portion slidably engaged with corresponding ones of said plurality of first slot-type receivers.

30. An electromagnetic rotary machine according to claim 29, wherein each of said interconnecting members is formed integrally with said corresponding one of said plurality of modules.

31. An electromagnetic rotary machine according to claim 29, wherein said corresponding one of said plurality of modules includes a plurality of second slot-type receivers, and each of said interconnecting members includes a second headed portion fixedly engaged in a corresponding one of said plurality of second slot-type receivers.

32. An electromagnetic rotary machine according to claim 28, wherein each of said plurality of modules includes a plurality of first slot-type receivers, and each of said interconnecting members is fixed to said support frame and includes a first headed portion slidably engaged with corresponding ones of said plurality of receivers.

33. An electromagnetic rotary machine according to claim 32, wherein said interconnecting members is formed integrally with said support frame.

34. An electromagnetic rotary machine according to claim 32, wherein said support frame includes a plurality of second slot-type receivers, and each of said interconnecting members includes a second headed portion fixedly engaged in a corresponding one of said plurality of second slot-type receivers.

35. An electromagnetic rotary machine according to claim 16, wherein said circular active portion has a plurality of electrical coils and a number of electrical phases repeating sequentially and equally around said annular active portion, wherein all of said plurality of modules contain the same number of said plurality of electrical coils as one another, each of said plurality of modules includes a plurality of said electrical phases, and the amount of said plurality of electrical coils on each of said plurality of modules is not an integer multiple of said number of electrical phases.

36. An electromagnetic rotary machine according to claim 35, wherein said at least one tooth includes first and second end teeth located at opposing ends of said core and at least one central tooth located between said first and second end teeth, each of said at least one central tooth having a width and each of said first and second end teeth having a width less than said width of said at least one central tooth.

37. An electromagnetic rotary machine according to claim 35, wherein each of said plurality of modules has an insertion end for being inserted into said support frame first relative to other parts of that one of said plurality of modules and, prior to being engaged with said support frame, includes a securing end member fixed to said core opposite said insertion end, wherein said securing end member is configured for securing that one of said plurality of modules to said support frame.

38. An electromagnetic rotary machine according to claim 16, wherein said body is defined by a wall that has a circular transverse cross-sectional shape having a diameter that is substantially the same as said diameter of said tubing, such that, when said tubing substantially returns to said original un-deformed shape within said body, said tubing engages said wall throughout said body.

39. A module for an active portion of an electromagnetic rotary machine having a support frame for supporting the active portion, wherein the active portion has a circular shape, the module comprising:
- a core forming an arc-segment of the circular shape of the active portion, said core including:
  - a back having a first side, a second side spaced from said first side, a third side, a fourth side spaced from said third side, a first end, and a second end spaced from said first end along said arc-segment;
  - at least one tooth extending from said back on said first side;
  - at least one coolant conduit; and
  - a plurality of receptacle segments located on said second side, said plurality of receptacle segments receiving said at least one coolant conduit, each of said plurality of receptacle segments forming an open recess in said core;
  - wherein each said open recess has a body, a throat opening, and a transverse cross section of an Ω-shape defined by said body and said throat opening, and said at least one coolant conduit has a press-fit engagement with each said open recess so as to conform to said Ω-shape, wherein:
    - said throat opening has a width in a plane containing said transverse cross-section:
    - said at least one coolant conduit has an original un-deformed shape and a diameter greater than said width; and
    - said press-fit engagement with each said open recess is effected by substantially only elastic deformation of said at least one conduit as said at least one conduit is forced through said throat opening such that said at least one conduit substantially returns to said original un-deformed shape when said at least one conduit is located in said body;
- at least one electrical coil correspondingly respectively surrounding each of said at least one tooth;
- at least one sliding-interlock feature on said second side of said core, said at least one sliding-interlock feature configured to correspondingly respectively slidably engage at least one mating sliding-interlock feature on the support frame of the electromagnetic rotary machine; and
- an end member secured to said core at said third side and extending beyond said second side and each of said at least one sliding-interlock feature to provide an interference with the support frame when the module is slidably engaged with the support frame so as to provide the module with a slide stop.

40. A module according to claim 39, wherein said at least one tooth includes first and second end teeth located respectively at said first and second ends of said back and at least one central tooth located between said first and second end teeth.

41. A module according to claim 40, wherein each of said at least one central tooth has a mean width and each of said first and second end teeth has a mean width less than said mean width of each of said at least one central tooth.

42. A module according to claim 40, wherein said at least one central tooth has a height, extending in a direction away from said first and second sides, and each of said first and second end teeth has a height, extending in said direction, that is about half said height of said at least one central tooth.

43. A module according to claim 39, wherein said second side of said core has a face extending between said first and second ends and said at least one coolant conduit has a swaged engagement with said plurality of recessed receptacle segments so that said at least one coolant conduit has an outer surface that is substantially flush with said face.

44. A module according to claim 39, wherein said at least one conduit is a tube engaged with ones of said plurality of recessed receptacle segments in a serpentine manner so that said tube includes a reversal-bend between each pair of adjacent ones of said plurality of recessed receptacle segments with which said single tube is engaged.

45. A module according to claim 44, wherein each of said plurality of recessed receptacles extends from said third end to said fourth end, each said reversal-bend being located beyond a corresponding one of said third and fourth ends.

46. A module according to claim 39, wherein the active portion has a plurality of electrical coils and a number of electrical phases repeating sequentially and equally around the active portion, wherein said module contains a plurality of said electrical phases and an integer dividend of the plurality of electrical coils and said integer dividend is not an integer multiple of the number of electrical phases.

47. A module according to claim 39, wherein said end member is configured to be fixedly secured to the support frame.

48. A module according to claim 39, wherein said end member includes a plurality of brackets extending substantially perpendicular to and beyond said second side.

49. A module according to claim 48, wherein:
- said at least one sliding-interlock feature comprises a plurality of sliding interlock members on said second side and each having a longitudinal axis substantially perpendicular to said end member, said plurality of sliding interlock members designed and configured to allow the module to slidingly engage the support frame; and
- at least some of said plurality of said brackets are respectively secured to said plurality of sliding interlock members.

50. A module according to claim 39, wherein said at least one sliding-interlock feature includes a pair of spaced interference slots in said core, each of said spaced interference slots having a longitudinal axis extending between said third and fourth ends of said core.

51. A module according to claim 39, wherein said at least one sliding-interlock feature includes a pair of headed members secured to said core on said second side and spaced from one another in a direction parallel to said third and fourth sides, each of said pair of headed members including a first interference head spaced from said core in a direction away from said plurality of teeth.

52. A module according to claim 51, wherein said core includes a pair of spaced interference slots each having a longitudinal axis extending between said third and fourth sides of said core, each of said pair of headed members including a second interference head conformally engaged in a corresponding one of said pair of spaced interference slots.

53. A module according to claim 39, wherein said core comprises a plurality of laminations secured to one another.

54. An electromagnetic rotary machine according to claim 39, wherein said body is defined by a wall that has a circular transverse cross-sectional shape having a diameter that is substantially the same as said diameter of said coolant conduit, such that, when said at least one coolant conduit substantially returns to said original un-deformed shape within said body, said at least one coolant conduit engages said wall throughout said body.

55. A module for an active portion of an electromagnetic rotary machine having a support frame for the active portion, wherein the active portion has a circular shape, the module comprising:
   a core forming an arc-segment of the circular shape of the active portion, said core including:
      a back having a first side, a second side spaced from said first side, a third side, a fourth side spaced from said third side, a first end, and a second end spaced from said first end along said arc-segment; and
      at least one tooth extending from said back on said first side;
      at least one electrical coil correspondingly respectively surrounding each of said at least one tooth;
   at least one coolant conduit; and
   a plurality of receptacle segments on said second side, each of said plurality of receptacle segments forming an open recess in said back, wherein each said open recess has a body, a throat opening, and a transverse cross-section of a substantially Ω-shape defined by said body and said throat opening, and said at least one coolant conduit has a press-fit engagement with each said open recess so as to conform to said substantially Ω-shape, wherein:
      said throat opening has a width in a plane containing said transverse cross-section;
      said at least one coolant conduit has an original un-deformed shape and a diameter greater than said width,
      said press-fit engagement with each said open recess is effected by substantially only elastic deformation of said at least one conduit as said at least one conduit is forced through said throat opening such that said at least one conduit substantially located in said body;
   at least one sliding-interlock feature on said second side of said core, said at least one sliding-interlock feature configured to correspondingly respectively slidably engage at least one mating sliding-interlock feature on the support frame of the electromagnetic rotary machine; and
   an end member secured to said core at said third side and extending beyond said second side and each of said at least one sliding-interlock feature to provide an interference with the support frame when the module is slidably engaged with the support frame so as to provide the module with a slide stop.

56. A module according to claim 55, wherein said at least one tooth includes first and second end teeth located respectively at said first and second ends of said back and at least one central tooth.

57. A module according to claim 56, wherein each of said at least one central tooth has a mean width and each of said first and second end teeth has a mean width equal to about one-half of said mean width of each of said at least one central tooth.

58. A module according to claim 56, wherein said at least one central tooth has a height, extending in a direction away from said first and second sides, and each of said first and second end teeth has a height, extending in said direction, that is about half said height of said at least one central tooth.

59. A module according to claim 55, wherein said second side of said core has a face extending between said first and second ends and said at least one coolant conduit has a swaged engagement with said plurality of recessed receptacle segments so that said at least one coolant conduit has an outer surface that is flush with said face.

60. A module according to claim 55, wherein said at least one conduit is a tube engaged with ones of said plurality of recessed receptacle segments in a serpentine manner so that said tube includes a reversal-bend between each pair of adjacent ones of said plurality of recessed receptacle segments with which said single tube is engaged.

61. A module according to claim 60, wherein each of said plurality of recessed receptacles extends from said third end to said fourth end, each said reversal-bend being located beyond a corresponding one of said third and fourth ends.

62. A module according to claim 55, wherein the active portion has a plurality of electrical coils and a number of electrical phases repeating sequentially and equally around the active portion, wherein said module contains an integer dividend of the plurality of electrical coils and said integer dividend is not an integer multiple of the number of electrical phases.

63. A module according to claim 55, wherein said member is configured to be fixedly secured to the support frame.

64. The module according to claim 55, further comprising at least one sliding-interlock feature on said second side of said core, said at least one sliding-interlock feature configured to correspondingly respectively slidably engage at least one mating sliding-interlock feature on the support frame of the electromagnetic rotary machine.

65. A module according to claim 64, wherein said at least one sliding-interlock feature includes a pair of spaced interference slots in said core, each of said spaced interference slots having a longitudinal axis extending between said third and fourth sides of said core.

66. A module according to claim 64, wherein said at least one sliding-interlock feature includes a pair of headed members secured to said core on said second side and spaced from one another in a direction parallel to said third and fourth sides, each of said pair of headed members including a first interference head spaced from said core in a direction away from said plurality of teeth.

67. A module according to claim 66, wherein said core includes a pair of spaced interference slots each having a longitudinal axis extending between said third and fourth sides of said core, each of said pair of headed members including a second interference head conformally engaged in a corresponding one of said pair of spaced interference slots.

68. A module according to claim 55, wherein said core comprises a plurality of layers secured to one another.

69. A module according to claim 55, further comprising an end member secured to said core on said third side, said end member designed and configured to extend beyond said second side so as to provide the module with an insertion stop when said module is being inserted into the support frame.

70. A module according to claim 69, wherein said end member includes a plurality of brackets extending substantially perpendicular to and beyond said second side.

71. A module according to claim 70, wherein:
   said module further comprises a plurality of sliding interlock members on said second side and each having a longitudinal axis substantially perpendicular to said end member, said plurality of sliding interlock members designed and configured to allow the module to slidingly engage the support frame; and
   at least some of said plurality of said brackets are respectively secured to said plurality of sliding interlock members.

72. An electromagnetic rotary machine according to claim 55, wherein said body is defined by a wall that has a circular transverse cross-sectional shape having a diameter that is substantially the same as said diameter of said coolant conduit, such that, when said at least one coolant conduit substantially returns to said original un-deformed shape within said body, said at least one coolant conduit engages said wall throughout said body.

* * * * *